(12) United States Patent
Hall et al.

(10) Patent No.: US 10,601,228 B2
(45) Date of Patent: Mar. 24, 2020

(54) INTELLIGENT CURRENT LIMITING TO ENABLE CHAINING OF AC AND DC APPLIANCES

(71) Applicants: David R. Hall, Provo, UT (US); Jerome Miles, Spanish Fork, UT (US); Christopher Jones, Spanish Fork, UT (US); Jonathan Conley, Provo, UT (US); Andrew Priddis, Mapleton, UT (US)

(72) Inventors: David R. Hall, Provo, UT (US); Jerome Miles, Spanish Fork, UT (US); Christopher Jones, Spanish Fork, UT (US); Jonathan Conley, Provo, UT (US); Andrew Priddis, Mapleton, UT (US)

(73) Assignee: Hall Labs LLC, Provo, UT (US)

(*) Notice: Subject to any disclaimer, the term of this patent is extended or adjusted under 35 U.S.C. 154(b) by 264 days.

(21) Appl. No.: 15/443,434

(22) Filed: Feb. 27, 2017

(65) Prior Publication Data
US 2018/0248382 A1    Aug. 30, 2018

Related U.S. Application Data

(63) Continuation of application No. 15/441,928, filed on Feb. 24, 2017, and a continuation of application No. 15/443,312, filed on Feb. 27, 2017.

(51) Int. Cl.
*H02J 5/00* (2016.01)
*H02J 3/00* (2006.01)
(Continued)

(52) U.S. Cl.
CPC .................... *H02J 5/00* (2013.01); *H02J 1/04* (2013.01); *H02J 3/00* (2013.01); *H01R 13/70* (2013.01);
(Continued)

(58) Field of Classification Search
None
See application file for complete search history.

(56) References Cited

U.S. PATENT DOCUMENTS

| 4,080,040 A * | 3/1978 | Lancaster | H01R 13/7033 439/332 |
| 8,210,868 B1 * | 7/2012 | Robling | H01R 31/02 439/502 |

(Continued)

FOREIGN PATENT DOCUMENTS

WO    WO-9831086 A1 *  7/1998  .............. H02J 13/00

*Primary Examiner* — Jared Fureman
*Assistant Examiner* — James P Evans

(57) ABSTRACT

The invention is a method for intelligent current limiting enabling chaining of electrical appliances. Different embodiments apply to alternating current (AC) appliances, direct current (DC) appliances, and a combination of each. In each embodiment, current limits control the number of appliances that can be connected in the chain. If current limits are exceeded, current-limiting devices cut power to one or more of the appliances. Each appliance in the system has conductors with the capacity to carry a current load at least as large as the overall current limit. Preferably, the appliances in the system are garage appliances that are mounted to an overhead track system in a garage, where electrical outlets are scarce.

20 Claims, 15 Drawing Sheets

(51) Int. Cl.
*H02J 13/00* (2006.01)
*H02J 1/04* (2006.01)
*H01R 13/70* (2006.01)

(52) U.S. Cl.
CPC ....... *H02J 13/0003* (2013.01); *H02J 13/0006* (2013.01); *H02J 13/0096* (2013.01); *Y02B 70/3266* (2013.01); *Y04S 20/242* (2013.01)

(56) References Cited

U.S. PATENT DOCUMENTS

| | | | | |
|---|---|---|---|---|
| 8,491,155 B1* | 7/2013 | Cherry, II | ......... | H05B 37/0263 |
| | | | | 315/185 R |
| 2003/0198048 A1* | 10/2003 | Frederick | ............. | H05B 39/00 |
| | | | | 362/249.01 |
| 2004/0130213 A1* | 7/2004 | Goldsholl | ............ | H01R 25/003 |
| | | | | 307/11 |
| 2004/0165384 A1* | 8/2004 | Allen | ...................... | F21V 15/01 |
| | | | | 362/267 |
| 2005/0102043 A1* | 5/2005 | Menas | ...................... | G06F 1/26 |
| | | | | 700/22 |
| 2007/0072476 A1* | 3/2007 | Milan | .................. | H01R 25/003 |
| | | | | 439/373 |
| 2008/0211310 A1* | 9/2008 | Jitaru | .................. | H01R 31/065 |
| | | | | 307/72 |
| 2010/0254132 A1* | 10/2010 | Wassel | ...................... | F21V 7/00 |
| | | | | 362/235 |
| 2011/0254382 A1* | 10/2011 | Melendez | ................ | G01D 4/00 |
| | | | | 307/126 |
| 2012/0007516 A1* | 1/2012 | Lax | ........................... | F21S 2/00 |
| | | | | 315/201 |
| 2012/0106149 A1* | 5/2012 | Boa | .......................... | F21V 3/04 |
| | | | | 362/235 |
| 2013/0257346 A1* | 10/2013 | Jakins | ................... | H02J 7/0044 |
| | | | | 320/107 |
| 2015/0214708 A1* | 7/2015 | Segnit | ...................... | H02G 3/16 |
| | | | | 361/42 |
| 2015/0236453 A1* | 8/2015 | Magee, Jr. | ............. | H01R 13/70 |
| | | | | 307/40 |
| 2015/0263513 A1* | 9/2015 | Newell | .................... | H02H 7/22 |
| | | | | 361/111 |
| 2015/0372423 A1* | 12/2015 | Dickey | .............. | H01R 13/6395 |
| | | | | 307/24 |
| 2016/0025316 A1* | 1/2016 | Chien | .................. | F21V 23/023 |
| | | | | 362/253 |
| 2016/0099575 A1* | 4/2016 | Velderman | ................ | H02J 5/00 |
| | | | | 307/72 |
| 2016/0141903 A1* | 5/2016 | Chen | .................... | H02J 7/0052 |
| | | | | 320/111 |
| 2016/0183338 A1* | 6/2016 | Loomis | .................... | F21S 4/10 |
| | | | | 315/185 R |
| 2016/0197504 A1* | 7/2016 | Hsia | ..................... | H02J 7/0045 |
| | | | | 307/23 |
| 2018/0007750 A1* | 1/2018 | Meitl | .................. | H01L 27/0288 |

* cited by examiner

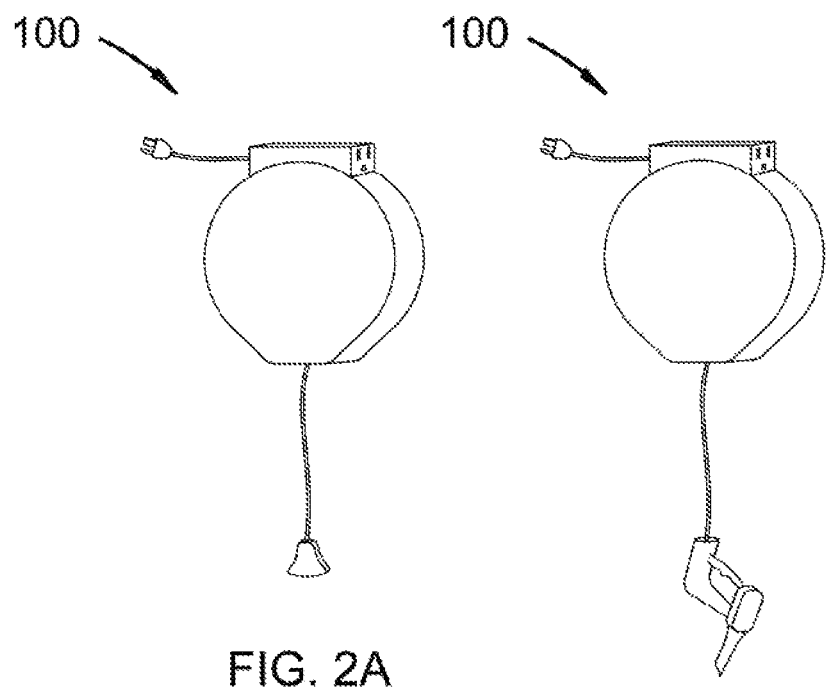
FIG. 2A
FIG. 2B
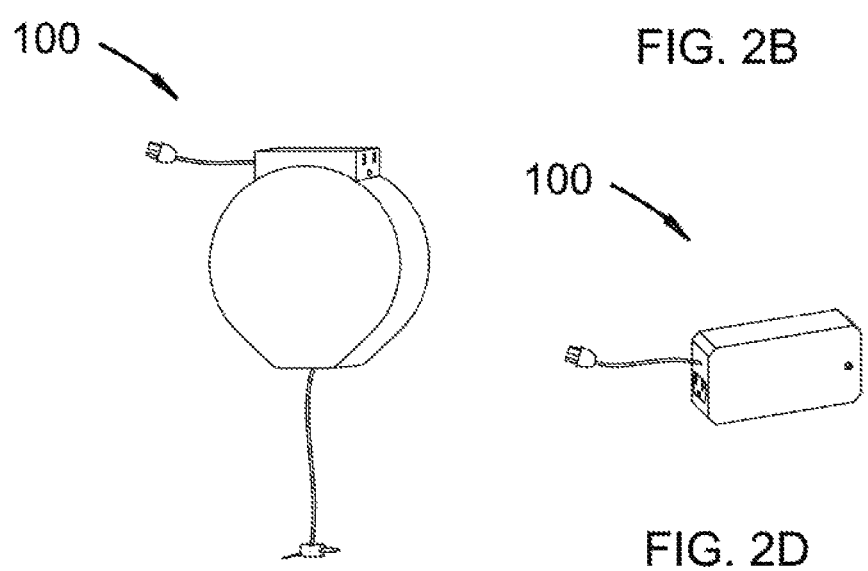
FIG. 2C
FIG. 2D

INTELLIGENT CURRENT LIMITING TO ENABLE CHAINING OF AC AND DC APPLIANCES

CROSS-REFERENCES

This application is a continuation of U.S. patent application Ser. No. 15/441,928 filed on Feb. 24, 2017 entitled "Intelligent Current Limiting to Enable Daisy Chaining of AC Appliances"; and U.S. patent application Ser. No. 15/443,312 filed on Feb. 27, 2017 entitled "Intelligent Current Limiting to Enable Daisy Chaining of DC Appliances."

TECHNICAL FIELD

This invention relates generally to the field of electrical appliances, and more specifically to intelligent current limiting.

BACKGROUND

The electrical wiring in most buildings is designed such that sufficient electrical outlets are provided with regulated power supplies to power desired numbers and sizes of appliances in designated areas. In this way, needed appliances can be separately connected to electrical power with little trouble and without concern for creating electrical hazards, even without careful planning or electrical know-how. When electrical outlets are insufficient under typical wiring strategies, power strips and extension cords are used, providing safe ways around potential power supply limits.

However, in certain areas, such as in garages or exterior areas of buildings, where electrical outlets are extremely scarce, providing power to all desired appliances is an especial problem, which may not be resolvable by means of an ordinary power strip or an extension cord. At best, the problem may be addressed by complicated and tangled wiring schemes, which are inconvenient and unattractive. At worst, the stringing together of power strips or extension cords may lead to the melting of wires and fire hazards.

In light of the foregoing, what is needed is a simple wiring scheme that allows for the use of multiple appliances when electrical outlets are scarce. In particular, an intelligent wiring and current limiting method is needed for enabling appliances to be chained together.

SUMMARY OF THE INVENTION

The disclosed invention has been developed in response to the present state of the art and, in particular, in response to the problems and needs in the art that have not yet been fully solved by currently available components and methods. Accordingly, efficient structural components and methods have been developed to allow for intelligent current limiting to enable the chaining of electrical appliances. Consistent with the foregoing, a method for intelligent current limiting is disclosed.

A first embodiment may comprise a plurality of AC electrical appliances connected in a chain configuration to each other and to a local source of electrical power. Each AC electrical appliance may comprise an AC electrical input, an AC electrical output, and a conductor comprising an AC current-limiting device with an AC current limit common to the plurality of AC electrical appliances. The conductor connects the AC electrical input and the AC electrical output. Each conductor may have a current-carrying capacity greater than the AC current limit.

A second embodiment may comprise an AC/DC power adaptor connected to a local source of electrical power and a plurality of DC electrical appliances connected to the AC/DC power adaptor and to each other in a chain configuration. The AC/DC power adaptor may comprise an AC electrical inlet, a DC electrical outlet, and a DC current-limiting device having a DC current limit. Each of the plurality of DC electrical appliances may comprise a DC electrical input, a DC electrical output, and a conductor connecting the DC electrical input and the DC electrical output. Each conductor may have a current-carrying capacity greater than the DC current limit of the DC current-limiting device.

A third embodiment may comprise a plurality of AC electrical appliances connected in a chain configuration to each other and to a local source of electrical power. Each AC electrical appliance may comprise an AC electrical input, an AC electrical output, and a conductor comprising an AC current-limiting device with an AC current limit common to the plurality of AC electrical appliances. The conductor connects the AC electrical input and the AC electrical output. Each conductor may have a current-carrying capacity greater than the AC current limit. The plurality of AC electrical appliances may comprise one or more AC/DC power adaptors, which further comprise a DC electrical outlet and a DC current-limiting device that has a DC current limit. One or more DC electrical appliances may be connected to the one or more AC/DC power adaptors and to each other in one or more chain configurations. Each DC electrical appliance may comprise a DC electrical input, a DC electrical output, and a conductor connecting the DC electrical input and the DC electrical output. Each conductor may have a current-carrying capacity greater than the DC current limit of the DC current-limiting device.

BRIEF DESCRIPTION OF THE DRAWINGS

A more particular description of the invention briefly described above is made below by reference to specific embodiments depicted in drawings included with this application, in which:

FIG. 2A depicts one embodiment of an extension cord;

FIG. 2B depicts one embodiment of a vacuum;

FIG. 2C depicts one embodiment of an air pump;

FIG. 2D depicts one embodiment of a power adaptor;

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

Figure 1:
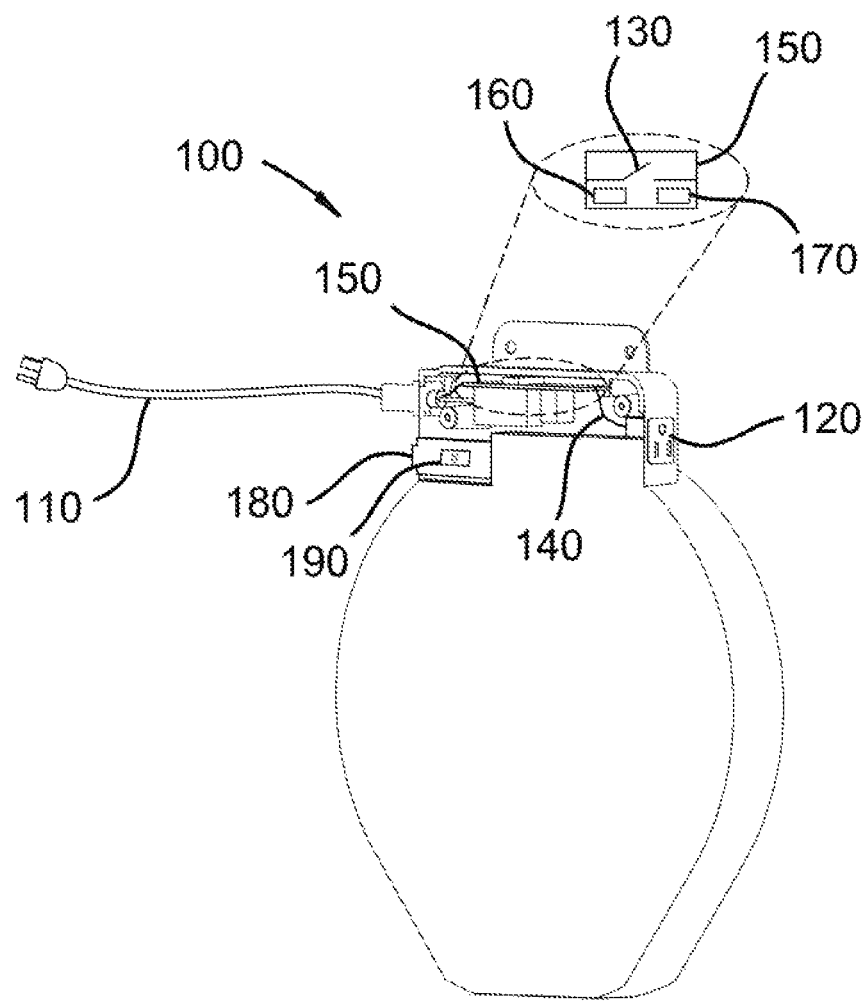
FIG. 1 depicts one embodiment of an AC electrical appliance.

FIG. 1 depicts one embodiment of an AC electrical appliance 100. In the instant invention, a plurality of AC electrical appliances 100 are connected in a chain configuration to each other and to a local source of electrical power. In one embodiment, the local source of electrical power is a standard wall outlet, preferably a 110-volt outlet. In one embodiment, the plurality of AC electrical appliances 100 operate on 110 volts of alternating current (AC). In other embodiments, the plurality of electrical appliances 100 may operate at higher or lower voltages. Each AC electrical appliance 100 comprises an AC electrical input 110, an AC electrical output 120, and a conductor 140. The conductor 140 connects the AC electrical input 110 and the AC electrical output 120.

In one embodiment, the AC electrical input 110 is a power cord. In one embodiment, the power cord is 6 feet long. The length of the power cord is significant in accounting for voltage drop. In a typical 110- to 120-volt wall outlet with 15 to 20 amps of current, a 6-foot power cord is a safe length that accounts for and minimizes voltage drop when chaining together several AC electrical appliances 100. In one embodiment, each power cord comprises a three-prong plug. In other embodiments, the AC electrical input 110 is another one of many types of electrical connectors commonly known in the art. In one embodiment, the AC electrical output 120 is an electrical outlet on the AC electrical appliance 100 into which a power cord can be plugged. In one embodiment, the AC electrical output 120 is a three-pronged electrical outlet. In other embodiments, the AC electrical output 120 is another one of many types of electrical connectors commonly known in the art.

Each conductor comprises an AC current-limiting device 130. The AC current-limiting device 130 has an AC current limit common to the plurality of AC electrical appliances 100. In one embodiment, the AC current limit is 10 amps. In other embodiments, the AC current limit is another amperage. In some embodiments, the AC current limit may be 15-20 amps, which is the standard current limit of a standard wall outlet, the preferable local source of electrical power. Standard wall outlets often have built-in AC current limits of 15-20 amps, and so the AC current limit of each AC current-limiting device 130 may be less than or equal to that current limit. The AC current-limiting device 130 in at least one of the plurality of AC electrical appliances 100 limits a flow of current in the conductor 140 inside the AC electrical appliance 100 when the flow of current within the conductor 140 approaches the AC current limit. In one embodiment, each AC current-limiting device 130 is a breaker. In one embodiment, each AC current-limiting device 130 is a 10-amp breaker. In another embodiment, each AC current-limiting device 130 is a digital current limiter, which may comprise a transistor, a microcontroller, and one or more sensors that monitor voltage and current. In other embodiments, each AC current-limiting device 130 may be another type of circuit protection device. In one embodiment, the AC current-limiting device 130 is located on a printed circuit board 150. In one embodiment, a switch 180 is also present, allowing the AC current-limiting device 130 to be reset if it is tripped. In one embodiment, the AC current-limiting device 130 in each AC electrical appliance 100 is located along the main circuit—the live wire—that connects each AC electrical appliance 100 in the chain configuration. In another embodiment, the AC current-limiting device 130 comprises a current monitor, and the monitor is connected to a breaker located on a circuit that powers components of the AC electrical appliance. The current monitor is on the main circuit, such that if the flow of current within the conductor 140 on the main circuit approaches the AC current limit, the monitor sends a signal to a breaker located on a circuit further inside the AC electrical appliance 100 that powers components of the AC electrical appliance 100, which trips, causing the AC electrical appliance 100 to lose power and function, limiting the flow of current in the conductor 140. However, power is still passed through the AC electrical appliance 100 to a subsequent AC electrical appliance 100 in the chain configuration.

The conductor 140 of each of the plurality of AC electrical appliances 100 has a current-carrying capacity greater than the AC current limit, which is common to the plurality of AC electrical appliances 100, and determined by the AC current-limiting devices 130 in each of the AC electrical appliances 100. In one embodiment, the AC current limit is 10 amps. In another embodiment, the AC current limit is between 15-20 amps. In one embodiment, each conductor 140 is a wire. In one embodiment, the current-carrying capacity of each conductor 140 equals a current-carrying capacity of a 16-gauge wire. This embodiment is especially suited for an AC current limit of 10 amps. In another embodiment, the current-carrying capacity of each conductor 140 equals a current-carrying capacity of a 14-gauge wire. In other embodiments, the current-carrying capacity of each conductor 140 is equal to the current-carrying capacity of wires with different gauges, but the conductor 140 in each AC electrical appliance 100 must be capable of carrying a current load greater than the AC current limit shared commonly by all of the plurality of AC electrical appliances 100. In one embodiment, the current-carrying capacity of the conductor 140 is between 1-10% greater than the AC current limit. In one embodiment, the conductor 140 is integrated into a printed circuit board 150. In one embodiment, the AC electrical appliance 100 comprises a microcontroller 160, which is located on the printed circuit board 150. In one embodiment, the AC electrical appliance 100 comprises a transceiver 170 in communication with a mobile electronic device. In one embodiment, the transceiver 170 is a Bluetooth chip. The mobile electronic device may have a user interface that allows a user to remotely operate the AC electronic appliance 100. In different embodiments, the transceiver 170 and the mobile electronic device communicate through wireless, Bluetooth, or other means commonly known by persons of skill in the art. In one embodiment, the microcontroller 160 may gauge and communicate to the mobile electronic device through the transceiver 170 the amount of power being consumed by the AC electronic appliance 100, and that amount can be viewed and adjusted by the user by means of the mobile electronic device. In one embodiment, each AC electrical appliance 100 further comprises a sensor 190 in communication with the conductor 140 that indicates the flow of current within the conductor 140. In one embodiment, when the flow of current approaches the AC current limit, the sensor 190 will indicate that the AC current limit is being approached by turning on a red LED light.

FIG. 2A-FIG. 2D depict embodiments of AC electrical appliances 100. In one embodiment, the plurality of AC electrical appliances 100 operate on 110 volts of alternating current (AC). In one embodiment, the plurality of AC electrical appliances 100 are selected from a group of garage appliances consisting of extension cords, vacuums, air pumps, power adaptors, and combinations thereof. FIG. 2A depicts one embodiment of an extension cord. FIG. 2B depicts one embodiment of a vacuum. FIG. 2C depicts one embodiment of an air pump. FIG. 2D depicts one embodiment of a power adaptor. In other embodiments, the plurality of AC electrical appliances 100 can be any of a variety of appliances built according to the specifications of the present invention.

Figure 3:
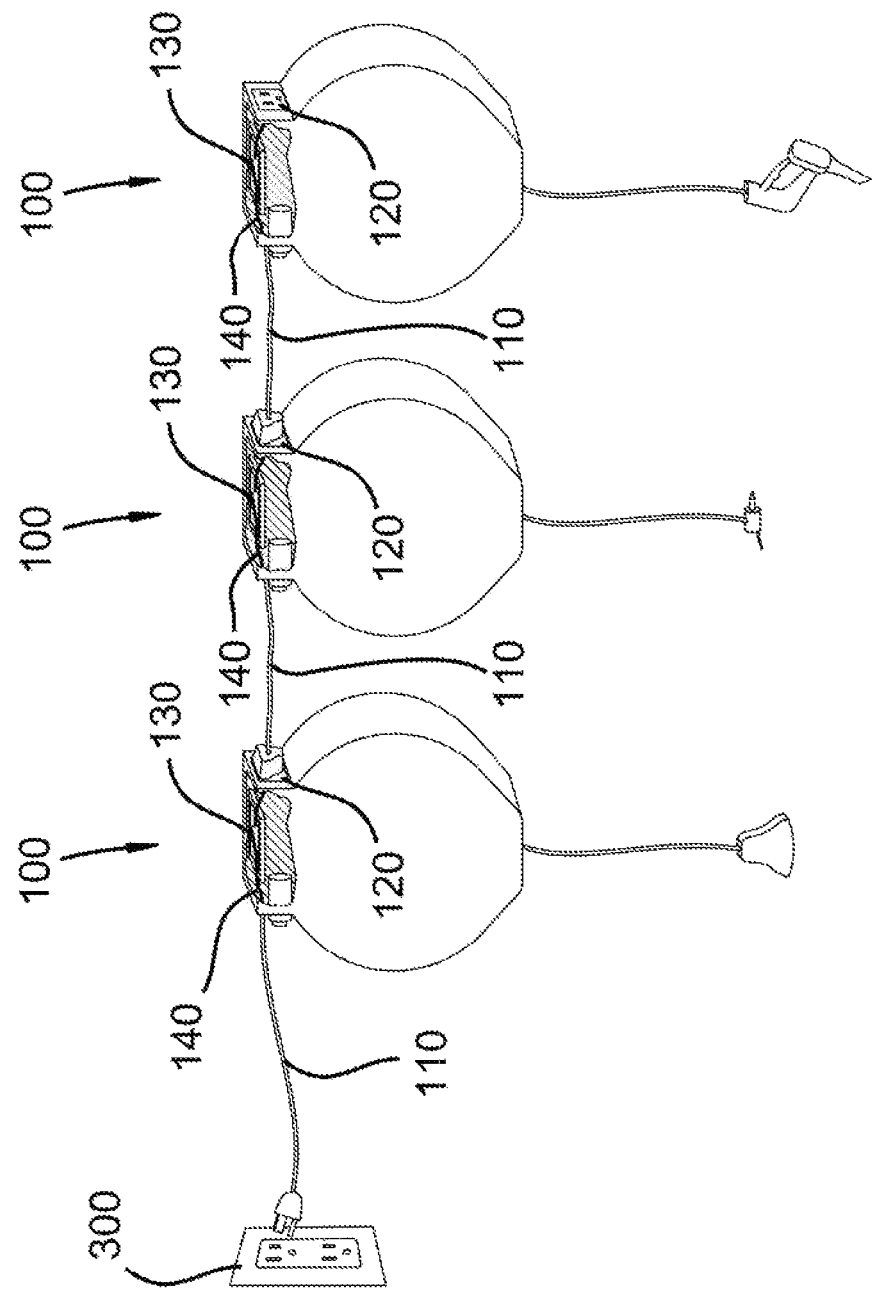
FIG. 3 depicts one embodiment of a plurality of AC electrical appliances connected in a chain configuration to each other and to a local source of electrical power.

FIG. 3 depicts one embodiment of a plurality of AC electrical appliances 100 connected in a chain configuration to each other and to a local source of electrical power 300. In one embodiment, the local source of electrical power 300 is a standard wall outlet. Standard wall outlets usually have AC current limits of 15-20 amps. Each AC electrical appliance 100 comprises an AC electrical input 110, an AC electrical output 120, and a conductor 140. The conductor 140 connects the AC electrical input 110 and the AC electrical output 120. Each conductor 140 comprises an AC current-limiting device 130 with an AC current limit common to the plurality of AC electrical appliances 100. In one embodiment, the AC current limit is 10 amps. The conductor 140 has a current-carrying capacity greater than the AC current limit. In one embodiment, the plurality of AC electrical appliances 100 are connected in a chain configuration to each other and to a local source of electrical power 300 in a parallel circuit. In a parallel circuit, the voltage across each AC electrical appliance 100 stays constant, but the total current passing through the system is the sum of the currents through each AC electrical appliance 100. Therefore, although a single AC electrical appliance may not require its conductor 140 to have a current-carrying capacity greater than the AC current limit common to the plurality of AC electrical appliances, as AC electrical appliances 100 are added and connected to each other in a chain configuration, the current requirements of each AC electrical appliance 100 in the chain add up, such that each AC electrical appliance 100 could potentially need to carry the full current load of the sum of the current requirements of each AC electrical appliance 100 in the chain, at least up to the AC current limit. Therefore, the conductor 140 inside each AC electrical appliance 100 must have a current-carrying capacity greater than the common AC current limit—in order for each AC electrical appliance 100 in the chain to safely (i.e. without melting wires or starting a fire) carry the current of multiple AC electrical appliances 100 chained together, up to the AC current limit.

In one embodiment, the plurality of AC electrical appliances 100 are connected in a chain configuration to each other and to a local source of electrical power 300 by means of the AC electrical input 110 and the AC electrical output 120 of each AC electrical appliance 100. In this embodiment, the AC electrical input 110 of one AC electrical appliance 100 is connected to the local source of electrical power 300. The AC electrical input 110 of a second AC electrical appliance 100 is connected to the AC electrical output 120 of the first AC electrical appliance 100. The AC electrical input 110 of a third AC electrical appliance 100 is connected to the AC electrical output 120 of the second AC electrical appliance 100, and so on, until a chain configuration of the plurality of AC electrical appliances 100 is formed. In one embodiment, the AC electrical input 110 of each AC electrical appliance 100 is a power cord, and the AC electrical output 120 of each AC electrical appliance 100 is an electrical outlet on the AC electrical appliance 100 into which a power cord can be plugged. In this embodiment, the power cord of one AC electrical appliance 100 is plugged into the local source of electrical power 300, which, in one embodiment, is a standard 110- to 120-volt wall outlet in a home or other building. The power cord of a second AC electrical appliance 100 is plugged into the electrical outlet of the first AC electrical appliance 100. The power cord of a third AC electrical appliance 100 is plugged into the outlet of the second AC electrical appliance, and so on, until the chain configuration is formed. The number of AC electrical appliances 100 in the chain depends upon the AC current limit, which is be controlled by the AC current-limiting devices 130 in each of the AC electrical appliances 100. When the flow of current within a conductor 140 of an AC electrical appliance 100 approaches the AC current limit, the AC current-limiting device 130 in at least one of the plurality of AC electrical appliances 100 limits a flow of current in the conductor 140 of the at least one AC electrical appliance 100. A user will then know that the chain of AC electrical appliances 100 is drawing too much power and at least one of the AC electrical appliances 100 should be removed from the chain. In one embodiment, each AC electrical appliance 100 comprises a sensor 190 in communication with the conductor 140 that indicates the flow of current within the conductor 140. In one embodiment, when the flow of current approaches the AC current limit, the sensor 190 will indicate that the AC current limit is being approached by turning on a red LED light.

Figure 4A:
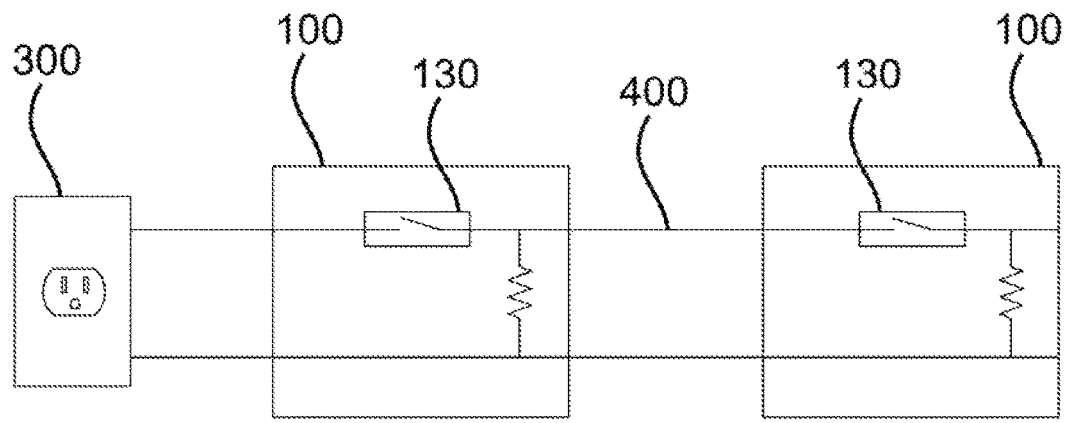
FIG. 4A depicts one embodiment of a circuit diagram of an AC current-limiting device in each of the plurality of AC electrical appliances located along the main circuit that connects each AC electrical appliance.
Figure 4B:
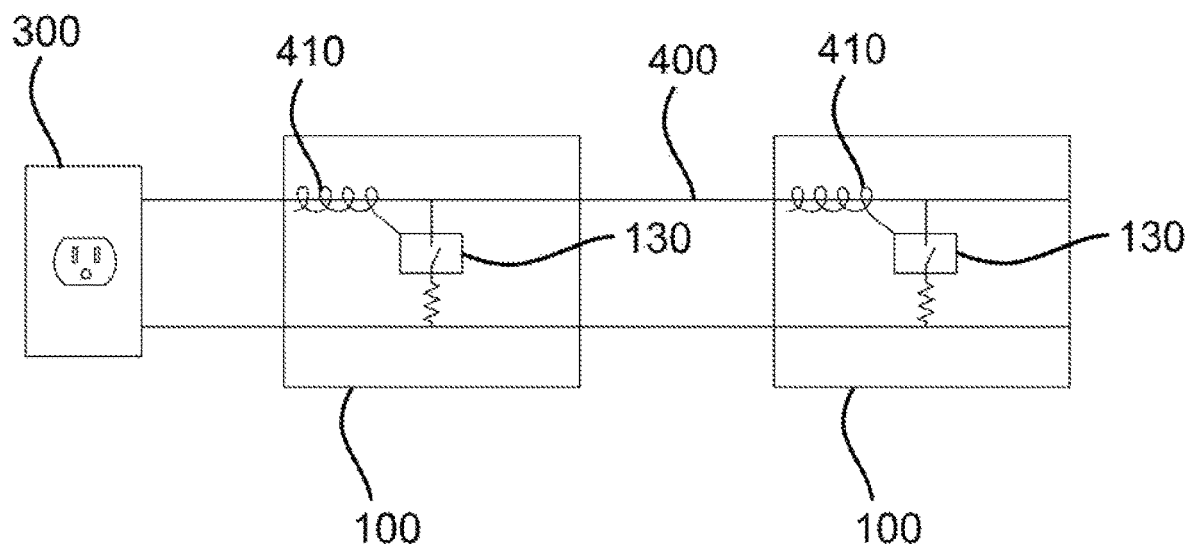
FIG. 4B depicts one embodiment of a circuit diagram of an AC current-limiting device in each of the plurality of AC electrical appliances comprising a current monitor connected to a breaker located on a circuit that powers components of the AC electrical appliance.

FIG. 4A and FIG. 4B depict embodiments of circuit diagrams of the AC current-limiting device 130 in each AC electrical appliance Each AC electrical appliance 100 comprises a conductor 140, which comprises an AC current-limiting device 130 with an AC current limit common to the plurality of AC electrical appliances 100. In one embodiment, each AC current-limiting device 130 is a breaker. In another embodiment, each AC current-limiting device 130 is a digital current limiter, which may comprise a transistor, a microcontroller, and one or more sensors that monitor voltage and current. In other embodiments, each AC current-limiting device 130 may be another type of circuit protection device. The AC current-limiting device 130 in at least one of the plurality of AC electrical appliances 100 limits a flow of current in the conductor 140 when the flow of current within the conductor 140 approaches the AC current limit. In one embodiment, the AC current limit is 10 amps. In another embodiment, the AC current limit is 15-20 amps, which is the same as the current limit of a standard wall outlet. Importantly, the AC current-limiting devices 130 in each of the plurality of AC electrical appliances 100 in the chain configuration share a common AC current limit.

In one embodiment, the AC current-limiting device 130 in each of the plurality of AC electrical appliances 100 is located along the main circuit 400, on the live wire, that connects each AC electrical appliance 100. This embodiment is depicted in FIG. 4A. The conductors 140 within each AC electrical appliance 100 are arranged in a parallel circuit, so that the total current through the plurality of AC electrical appliances 100 in the chain configuration is the sum of the currents through each AC electrical appliance 100. The conductor 140 in each AC electrical appliance 100 comprises an AC current-limiting device 130 with an AC current limit common to the plurality of AC electrical appliances 100. If an AC electrical appliance 100 is added to the chain that causes the sum of the currents through each electrical appliance 100 to approach the AC current limit, the AC current-limiting device 130 in one of the plurality of AC electrical appliances 100 is tripped and limits a flow of current in the conductor 140 of that AC electrical appliance 100. In one embodiment, the AC current-limiting device 130 in only one of the plurality of AC electrical appliances 100 is tripped, and the one that trips is the AC current-limiting device 130 that most quickly senses that the AC current limit has been exceeded. In this embodiment, any of the plurality of AC electrical appliances 100 downstream from the one of the plurality of AC electrical appliances 100 whose AC current-limiting device 130 is tripped will lose power. A user will then know that the plurality of AC electrical appliances 100 are drawing too much power and at least one of the AC electrical appliances 100 should be removed from the chain or turned off.

In another embodiment, the AC current-limiting device 130 in each of the plurality of AC electrical appliances 100 comprises a current monitor 410 connected to a breaker located on a circuit that powers components of the AC electrical appliance 100. This embodiment is depicted in FIG. 4B. In this embodiment, a current monitor 410 is located on the main circuit 400 that connects each AC electrical appliance 100 to each other. If the AC current limit on the main circuit 400 is exceeded, a breaker connected to the current monitor 410 in one of the AC electrical appliances 100 that senses the overdraw trips. The breaker is located on a circuit that powers components of the AC electrical appliance 100. That AC electrical appliance 100 loses power to its components, causing it to lose function, but power is still passed through the AC electrical appliance 100 along the main circuit 400 to subsequent AC electrical appliances 100 in the chain.

Figure 5:
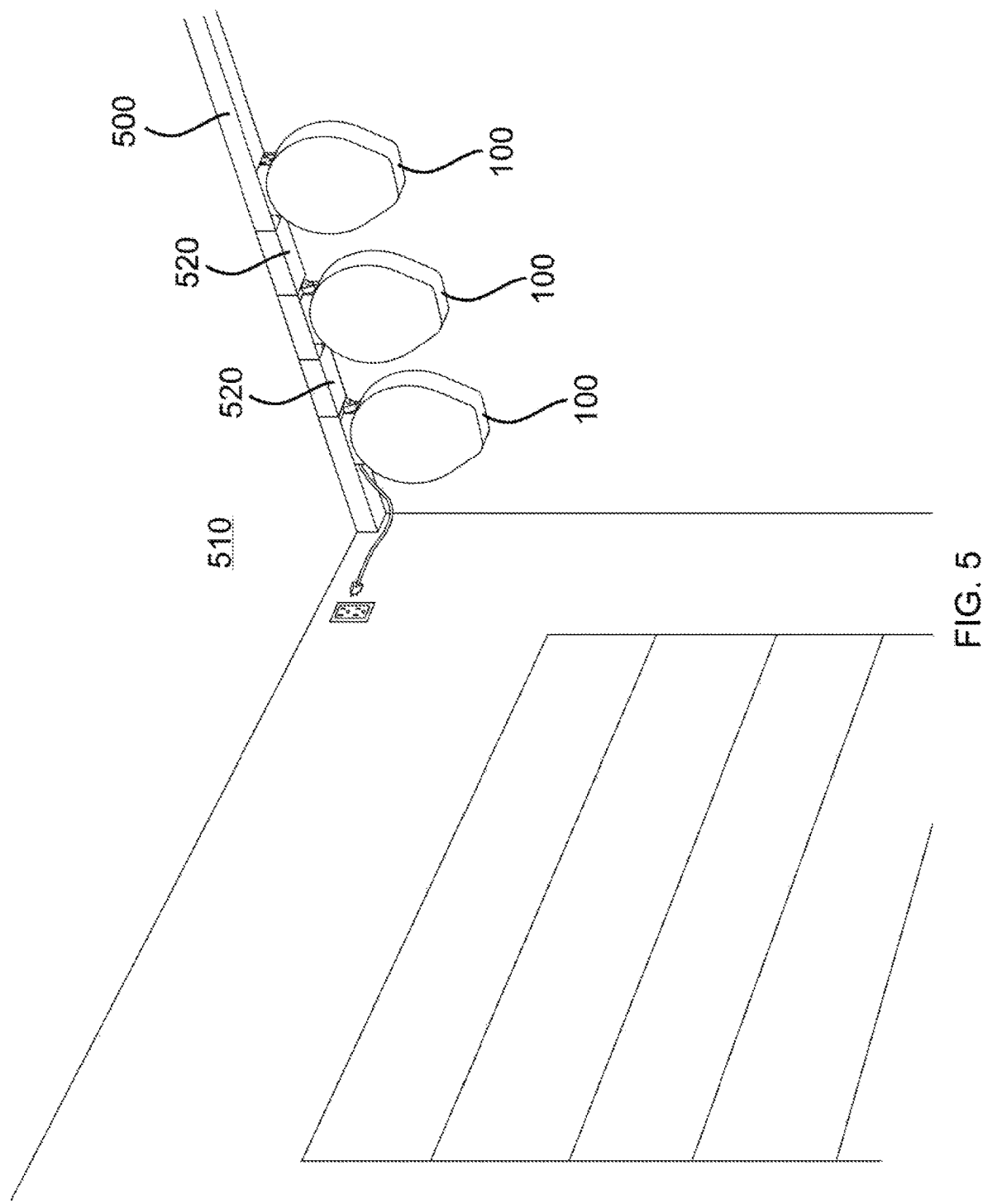
FIG. 5 depicts one embodiment of the plurality of AC electrical appliances mounted on a metal track on a garage ceiling.

FIG. 5 depicts one embodiment of the plurality of AC electrical appliances 100 mounted on a metal track 500 on a garage ceiling 510. In one embodiment, the plurality of AC electrical appliances 100 are selected from a group of garage appliances. That group may consist of extension cords, vacuums, air pumps, power adaptors, and combinations thereof. Garages tend to have a scarcity of electrical outlets. For this reason, intelligent current limiting that enables chaining of the plurality of AC electrical appliances 100 is particularly useful in a garage setting. In one embodiment, the metal track 500 allows each AC electrical appliance 100 to be conveniently mounted to the ceiling in a chain configuration. In one embodiment, track covers 520 shield the AC electrical inputs 110, which may be power cords, of the plurality of AC electrical appliances 100 from view.

Figure 6:
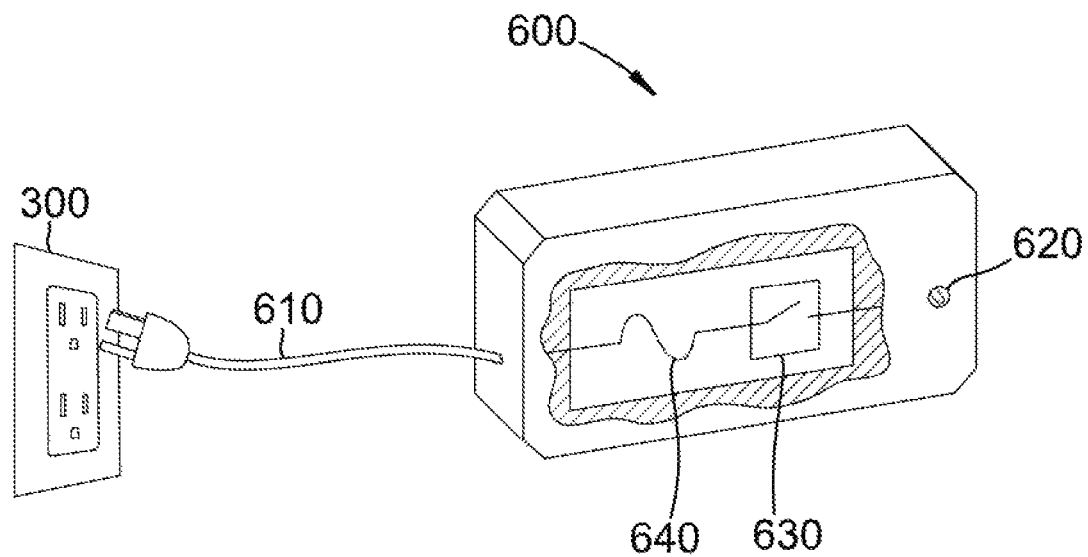
FIG. 6 depicts one embodiment of an AC/DC power adaptor connected to a local source of electrical power.

FIG. 6 depicts one embodiment of an AC/DC power adaptor 600 connected to a local source of electrical power 300. In one embodiment, the local source of electrical power 300 is a standard wall outlet. Standard wall outlets often supply 15-20 amps of alternating current (AC) at 110 or 120 volts. In another embodiment, the local source of electrical power 300 is another AC electrical appliance that the AC/DC power adaptor 600 is connected to in a chain configuration. The AC/DC power adaptor 600 converts the AC power supplied by the local source of electrical power 300 to DC power. In one embodiment, the AC/DC power adaptor 600 supplies direct current (DC) power at 14 volts. The AC/DC power adaptor 600 comprises an AC electrical inlet 610, a DC electrical outlet 620, and a DC current-limiting device 630 having a DC current limit. In one embodiment, the AC electrical inlet 610 is a power cord. In one embodiment, the power cord is 6 feet long. The length of the power cord is significant in accounting for voltage drop. If the local source of electrical power 300 is a typical 110- to 120-volt wall outlet with 15 to 20 amps of current, a 6-foot power cord is a safe length that accounts for and minimizes voltage drop. In one embodiment, the power cord comprises a three-prong plug. The three-prong plug may be plugged into a standard wall outlet. In other embodiments, the AC electrical inlet 610 is another of many types of electrical connectors commonly known in the art. In one embodiment, the DC electrical outlet 620 is a barrel connector. In this embodiment, a barrel extension cord can be plugged into the DC electrical outlet 620, the barrel connector, and into a subsequent DC electrical appliance, in order to connect the DC electrical appliance to the AC/DC power adaptor 600 in a chain configuration. In other embodiments, the DC electrical outlet 620 is another one of many types of electrical connectors commonly known in the art. In one embodiment, the DC current-limiting device 630 is a breaker. In another embodiment, the current-limiting device 630 is a digital current limiter, which may comprise a transistor, a microcontroller, and one or more sensors that monitor voltage and current. When the current-limiting device 630 is a digital current limiter, the AC/DC power adaptor 600 is also equipped with a fuse 640 to protect against the eventuality that the digital current limiter might fail. The DC current-limiting device 630 has a DC current limit. In one embodiment, the DC current limit is approximately 5 amps, which is equivalent to 70 watts of power at 14 volts. In other embodiments, the DC current-limiting device 630 has a higher or lower current limit. In one embodiment, the DC current-limiting device 630 limits a flow of current to the plurality of DC electronic appliances that may be connected to the AC/DC power adaptor 600 in a chain if the DC current limit is approached.

Figure 7:
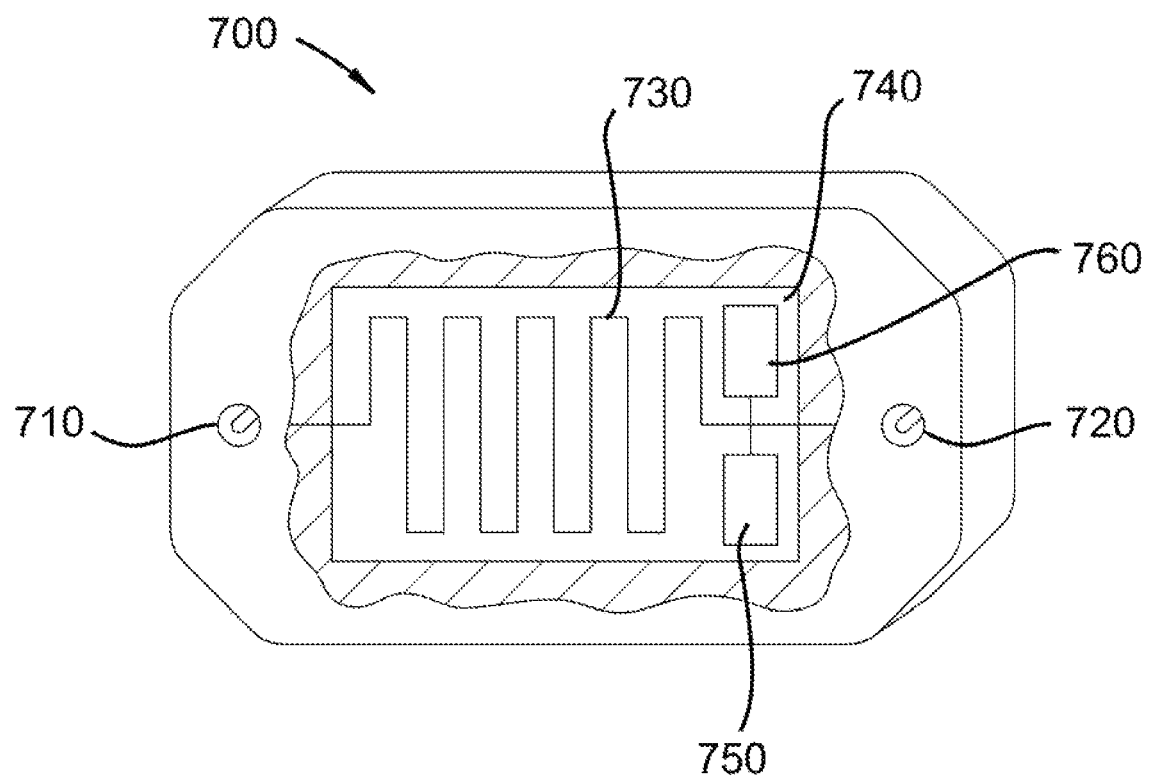
FIG. 7 depicts one embodiment of a DC electrical appliance.

FIG. 7 depicts one embodiment of a DC electrical appliance 700. In the instant invention, a plurality of DC electrical appliances 700 are connected to each other and to an AC/DC power adaptor 600 that is connected to a local source of electrical power 300 in a chain configuration. In one embodiment, each of the plurality of DC electrical appliances 700 operate on 14 volts of direct current (DC). In other embodiments, each of the plurality of DC electrical appliances 700 operate on 7.5 to 14 volts of direct current (DC). Each DC electrical appliance 700 comprises a DC electrical input 710, a DC electrical output 720, and a conductor 730. In one embodiment, the DC electrical input 710 and the DC electrical output 720 comprise barrel connectors. The barrel connectors connect with barrel extension cords that link the plurality of DC electrical appliances, from DC electrical inputs 710 to DC electrical outputs 720. In other embodiments, the DC electrical input 710 and the DC electrical output 720 are other types of electrical connectors commonly known in the art. In one embodiment, the DC electrical input 710 and the DC electrical output 720 are interchangeable. The conductor 730 connects the DC electrical input 710 and the DC electrical output 720. Each conductor 730 has a current-carrying capacity greater than the DC current limit of the DC current-limiting device 630 located within the AC/DC power adaptor 600. In one embodiment, the AC/DC power adaptor 600 supplies direct current (DC) power at 14 volts. In one embodiment, the DC current limit is approximately 5 amps, or 70 watts at 14 volts. In one embodiment, each conductor 730 is a wire. In one embodiment, the current-carrying capacity of each conductor 730 equals a current-carrying capacity of an 18-gauge wire. This embodiment is especially suited for a DC current limit of approximately 5 amps at 14 volts. In other embodiments, the current-carrying capacity of each conductor 730 equals the current-carrying capacity of wires with different gauges, but the conductor 730 in each DC electrical appliance 700 must be capable of carrying the full current load greater than the DC current limit of the DC current-limiting device 630 within the AC/DC power adaptor 600. In one embodiment, the conductor 730 is integrated into a printed circuit board (PCB) 740. In one embodiment, the DC electrical appliance 700 comprises a microcontroller 760, which is located on the printed circuit board 740. In one embodiment, the DC electrical appliance 700 comprises a transceiver 750 in communication with a mobile electronic device. In one embodiment, the transceiver 750 is a Bluetooth chip. The mobile electronic device may have a user interface that allows a user to remotely operate the DC electronic appliance 700. In different embodiments, the transceiver 750 and the mobile electronic device communicate through wireless, Bluetooth, or other means commonly known by persons of skill in the art.

Figure 8A:
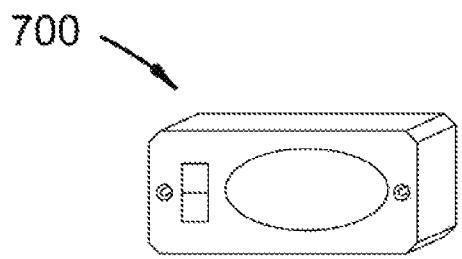
FIG. 8A depicts one embodiment of a light.
Figure 8C:
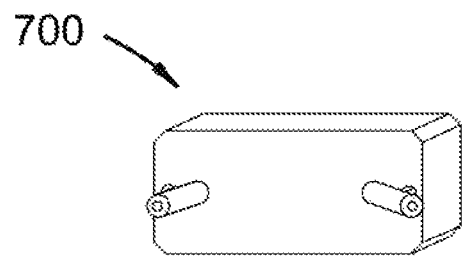
FIG. 8C depicts one embodiment of a parking assistant.
Figure 8B:
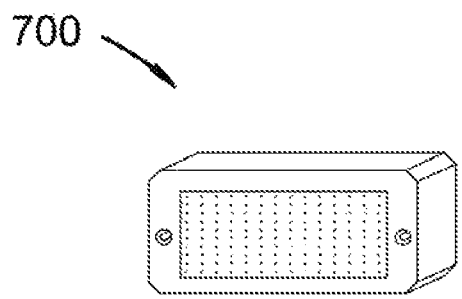
FIG. 8B depicts one embodiment of a speaker.
Figure 8D:
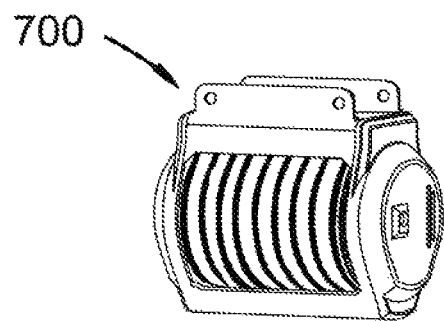
FIG. 8D depicts one embodiment of a power winch.

FIG. 8A-FIG. 8D depict embodiments of DC electrical appliances 700. In one embodiment, the plurality of DC electrical appliances 700 operate on 7.5-14 volts of direct current (DC). In one embodiment, the plurality of DC electrical appliances 700 are selected from a group of garage appliances consisting of lights, speakers, parking assistants, power winches, and combinations thereof. FIG. 8A depicts one embodiment of a light. FIG. 8B depicts one embodiment of a speaker. FIG. 8C depicts one embodiment of a parking assistant. FIG. 8D depicts one embodiment of a power winch. In other embodiments, the plurality of DC electrical appliances 700 can be any of a variety of appliances built according to the specifications of the present invention.

Figure 9:
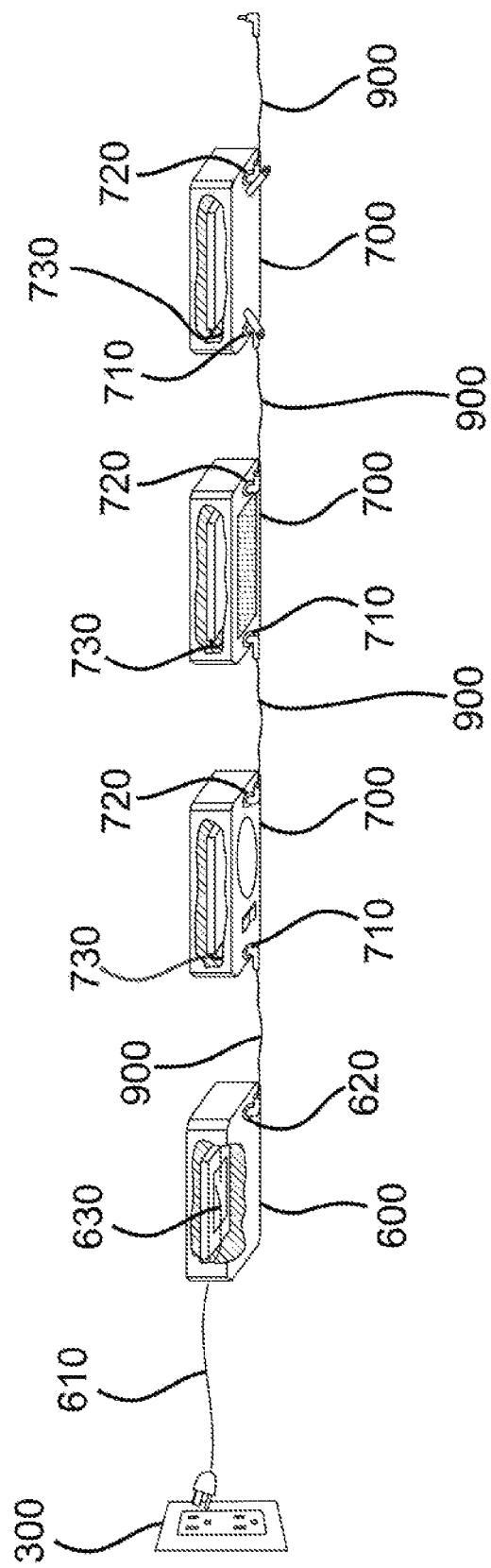
FIG. 9 depicts one embodiment of the plurality of DC electrical appliances connected in a chain configuration to each other and to the AC/DC power adaptor, which is connected to a local source of electrical power.

FIG. 9 depicts one embodiment of the plurality of DC electrical appliances 700 connected in a chain configuration to each other and to the AC/DC power adaptor 600, which is connected to a local source of electrical power 300. In one embodiment, the local source of electrical power 300 is a standard wall outlet. Standard wall outlets often supply 15-20 amps of alternating current (AC) at 110 or 120 volts. In another embodiment, the local source of electrical power 300 is an AC electrical appliance that the AC/DC power adaptor 600 is connected to in a chain configuration. The AC/DC power adaptor 600 converts the AC power from the local source of electrical power 300 to DC power. In one embodiment, the AC/DC power adaptor 600 supplies direct current (DC) power at 14 volts. The AC/DC power adaptor 600 has a DC current-limiting device 630 that has a DC current limit. In one embodiment, the DC current limit is approximately 5 amps, or 70 watts at 14 volts. The AC/DC power adaptor 600 is connected to the local source of electrical power 300, and the plurality of DC electrical appliances 700 are connected to the AC/DC power adaptor 600 and to each other in a chain configuration. Each DC electrical appliance 700 comprises a DC electrical input 710, a DC electrical output 720, and a conductor 730. The conductor 730 connects the DC electrical input 710 and the DC electrical output 720. Each conductor 730 has a current-carrying capacity greater than or equal to the DC current limit of the DC current-limiting device 630 in the AC/DC power adaptor 600. In one embodiment, the plurality of DC electrical appliances 700 are connected to the AC/DC power adaptor 600 and to each other in a chain configuration in a parallel circuit. In a parallel circuit, the voltage across each DC electrical appliance 700 stays constant, but the total current passing through the system is the sum of the currents through each DC electrical appliance 700. Therefore, although a single DC electrical appliance may not require a current-carrying capacity greater than the DC current limit of the DC current-limiting device 630 in the AC/DC power adaptor 600, as DC electrical appliances 700 are added and connected to each other in a chain configuration, the current requirements of each DC electrical appliance 700 in the chain add up, such that each DC electrical appliance 700 could potentially need to carry the full current load of the sum of the current requirements of each DC electrical appliance 700 in the chain, at least to a point greater than the DC current limit of the DC current-limiting device 630 of the AC/DC power adaptor 600. Therefore, each conductor 730 must have a current-carrying capacity greater than the DC current limit of the DC current-limiting device 630 of the AC/DC power adaptor 600—in order for each DC electrical appliance 700 in the chain to safely (i.e. without melting wires or starting a fire) carry the current of multiple DC electrical appliances 700 in the chain.

In one embodiment, the plurality of DC electrical appliances 700 are connected in a chain configuration to the AC/DC power adaptor 600 and to each other by means of the DC electrical input 710 and the DC electrical output 720 of each DC electrical appliance 700. In this embodiment, the AC electrical inlet 610 of the AC/DC power adaptor 600 is connected to the local source of electrical power 300, which may be a standard wall outlet. The DC electrical input 710 of one DC electrical appliance 700 is connected to the DC electrical outlet 620 of the AC/DC power adaptor 600. The DC electrical input 710 of a second DC electrical appliance 700 is connected to the DC electrical output 720 of the first DC electrical appliance 700. The DC electrical input 710 of a third DC electrical appliance 700 is connected to the DC electrical output 720 of the second DC electrical appliance 700, and so on, until a chain configuration of the plurality of DC electrical appliances 700 is formed. In one embodiment, the DC electrical input 710 of each DC electrical appliance 700 is a barrel connector, and the DC electrical output 720 of each DC electrical appliance 700 is also a barrel connector. In one embodiment, the DC electrical input 710 and the DC electrical output 720 are interchangeable. In one embodiment, the DC electrical outlet 620 of the AC/DC power adaptor 600 is also a barrel connector. In one embodiment, the plurality of DC electrical appliances 700 are connected to the AC/DC power adaptor 600 and to each other by means of one or more extension cords 900. In one embodiment, the one or more extension cords 900 are barrel extension cords. In this embodiment, the barrel connectors connect with the barrel extension cords to link the plurality of DC electrical appliances 700 to each other and to the AC/DC power adaptor 600 in a chain configuration. In one embodiment, the one or more extension cords 900 are approximately 25 feet long. The length of the one or more extension cords 900 is significant in accounting for voltage drop. A 25-foot extension cord is a safe length that accounts for and minimizes voltage drop when chaining together several DC electrical appliances 700 from an AC/DC power adaptor 600 operating at 14 volts of power. The number of DC electrical appliances 700 in the chain depends upon the DC current limit of the DC current-limiting device 630 of the AC/DC power adaptor 600. When the DC current limit is approached, the DC current-limiting device 630 limits a flow of current to the plurality of DC electrical appliances 700. A user will then know that the chain of DC electrical appliances 700 is drawing too much power and at least one of the DC electrical appliances 700 should be removed from the chain.

Figure 10:
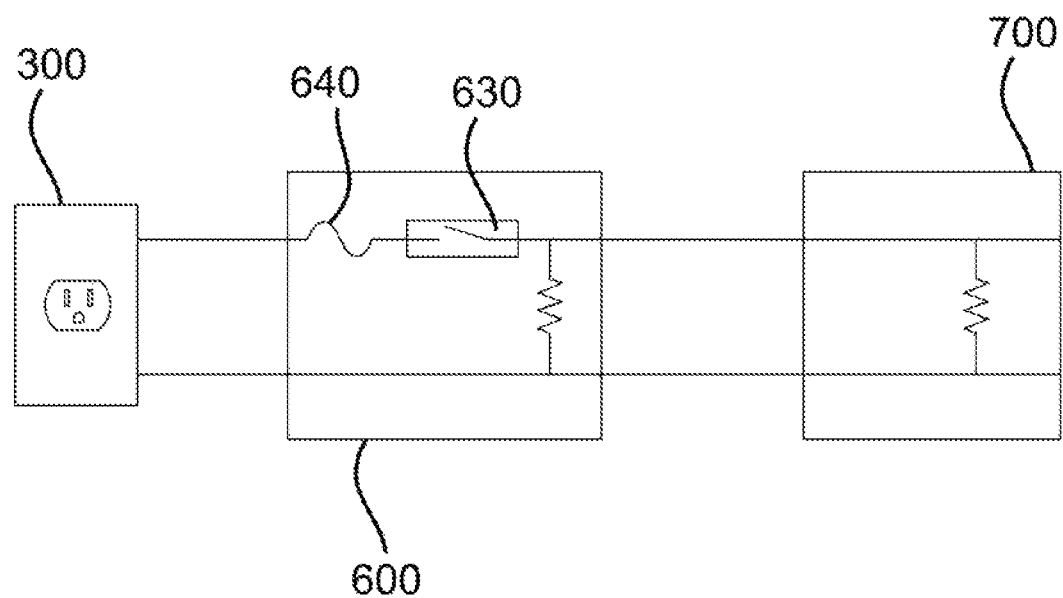
FIG. 10 depicts one embodiment of a circuit diagram of a DC current-limiting device along a circuit inside an AC/DC power adaptor.

FIG. 10 depicts one embodiment of a circuit diagram of a DC current-limiting device 630 along a circuit inside an AC/DC power adaptor 600. In one embodiment, the DC current-limiting device 630 is a breaker. In another embodiment, the current-limiting device 630 is a digital current limiter, which may comprise a transistor, a microcontroller, and one or more sensors that monitor voltage and current. When the current-limiting device 630 is a digital current limiter, the AC/DC power adaptor 600 is also equipped with a fuse 640 to protect against the eventuality that the digital current limiter might fail. The DC current-limiting device 630 has a DC current limit. In one embodiment, the DC current limit is approximately 5 amps, which is equivalent to 70 watts of power at 14 volts. In other embodiments, the DC current-limiting device 630 has a higher or lower current limit. In one embodiment, the DC current-limiting device 630 limits a flow of current to the plurality of DC electrical appliances 700 connected to the AC/DC power adaptor 600 and to each other in a chain configuration if the DC current limit is approached. A user will then know that the chain of DC electrical appliances 700 is drawing too much power and at least one of the DC electrical appliances 700 should be removed from the chain.

Figure 11:
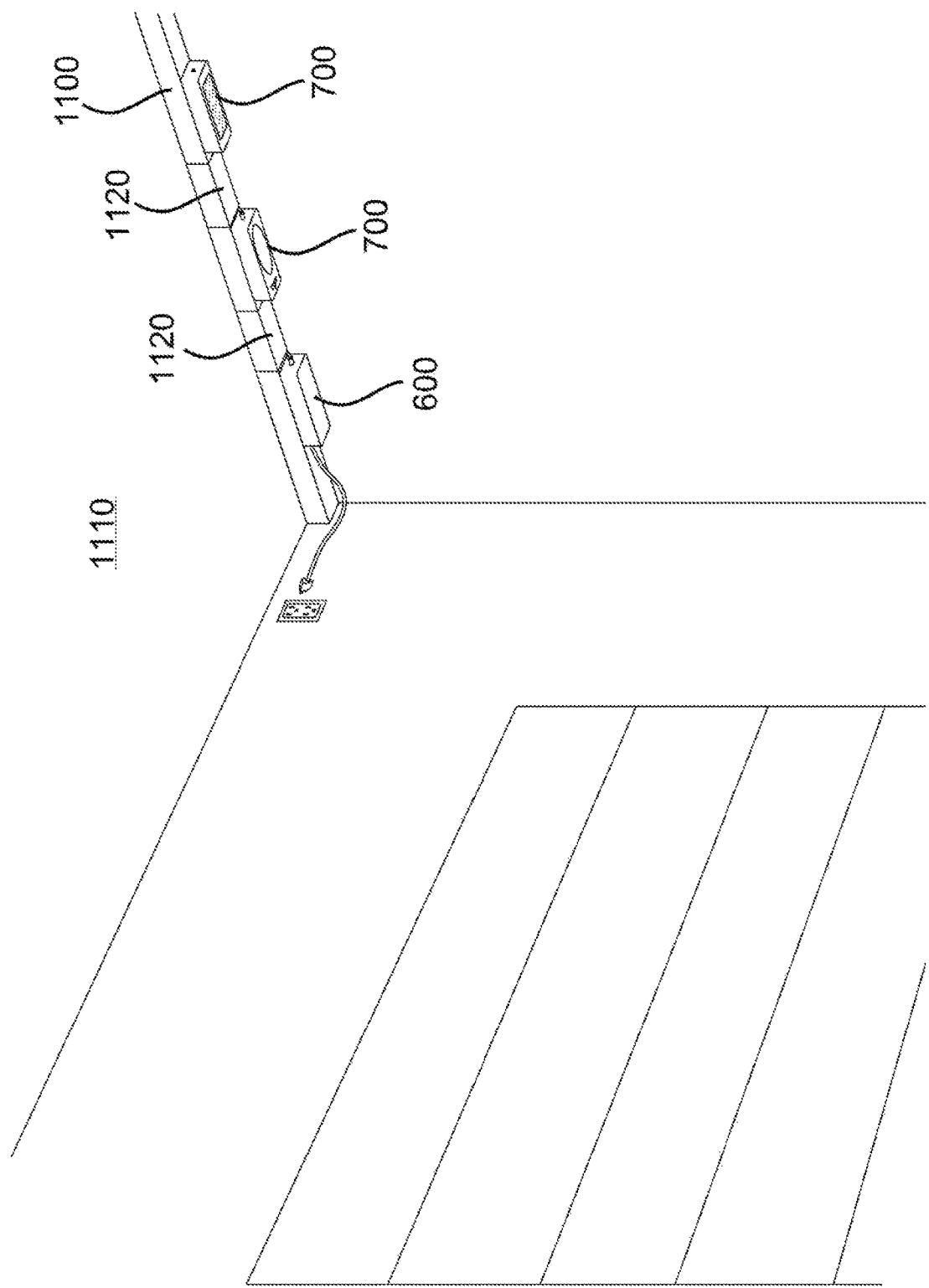
FIG. 11 depicts one embodiment of the plurality of DC electrical appliances mounted on a metal track on a garage ceiling.

FIG. 11 depicts one embodiment of the plurality of DC electrical appliances 700 mounted on a metal track 1100 on a garage ceiling 1110. In one embodiment, the plurality of DC electrical appliances 700 are selected from a group of garage appliances. That group may consist of lights, speakers, parking assistants, power winches, and combinations thereof. Garages tend to have a scarcity of electrical outlets. For this reason, intelligent current limiting that enables chaining of the plurality of DC electrical appliances 700 is particularly useful in a garage setting. In one embodiment, the metal track 1100 allows each DC electrical appliance 700 to be conveniently mounted to the ceiling in a chain configuration. In one embodiment, track covers 1120 shield extension cords that may connect the DC electrical inputs 710 and the DC electrical outputs 720 of the plurality of DC electrical appliances 700 in a chain configuration from view.

Figure 12:
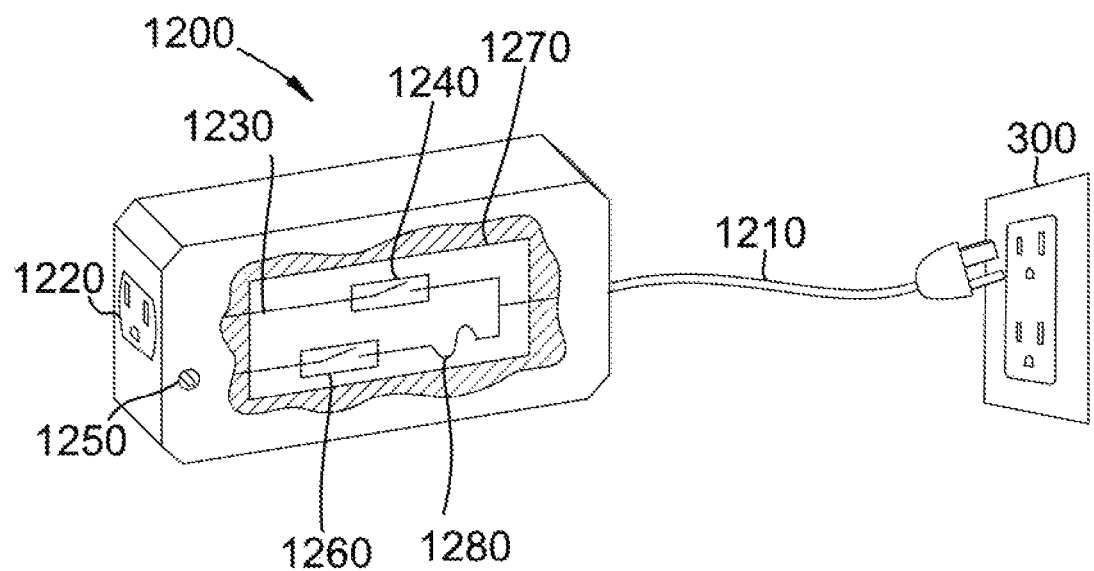
FIG. 12 depicts one embodiment of an AC electrical appliance comprising an AC/DC power adaptor.

FIG. 12 depicts one embodiment of an AC electrical appliance comprising an AC/DC power adaptor 1200. The AC electrical appliance comprising an AC/DC power adaptor 1200 comprises an AC electrical input 1210, an AC electrical output 1220, an AC conductor 1230 comprising an AC current-limiting device 1240 with an AC current limit common to a plurality of AC electrical appliances 100, a DC electrical outlet 1250, and a DC current-limiting device 1260, which has a DC current limit.

In one embodiment, the AC electrical input 1210 of the AC electrical appliance comprising an AC/DC power adaptor 1200 is a power cord. In one embodiment, the power cord is 6 feet long. The length of the power cord is significant in accounting for voltage drop. If a local source of electrical power 300 is a typical 110- to 120-volt wall outlet with 15 to 20 amps of current, a 6-foot power cord is a safe length that accounts for and minimizes voltage drop along the chain. In one embodiment, the power cord comprises a three-prong plug. In other embodiments, the AC electrical input 1210 is another of many types of electrical connectors commonly known in the art. In one embodiment, the AC electrical input 1210 of the AC electrical appliance comprising an AC/DC power adaptor 1200 is connected to a local source of electrical power 300, which may be a standard wall outlet. Standard wall outlets often supply 15-20 amps of alternating current (AC) at 110 or 120 volts. In another embodiment, the AC electrical input 1210 of the AC electrical appliance comprising an AC/DC power adaptor 1200 is connected to another AC electrical appliance 100 in a chain configuration, where one AC electrical appliance 100 in the chain is connected to a local source of electrical power 300. In one embodiment, the AC electrical output 1220 of the AC electrical appliance comprising an AC/DC power adaptor 1200 comprises a standard electrical outlet into which a power cord can be plugged. In one embodiment, the AC electrical output 1220 is a three-pronged electrical outlet. In other embodiments, the AC electrical output 1220 is another one of many types of electrical connectors commonly known in the art. In one embodiment, another AC electrical appliance 100 is connected into the AC electrical output 1220 of the AC electrical appliance comprising an AC/DC power adaptor 1200. In one embodiment, another AC electrical appliance comprising an AC/DC power adaptor 1200 is connected into the AC electrical output 1220 of the first AC electrical appliance comprising an AC/DC power adaptor 1200. Because the AC electrical appliance comprising an AC/DC power adaptor 1200 has an AC electrical output 1220, as well as a DC electrical outlet 1250, AC power can be passed through the AC electrical appliance comprising an AC/DC power adaptor 1200 to subsequent AC electrical appliances 100 connected to it in a chain configuration, and DC power can also be passed out the AC electrical appliance comprising an AC/DC power adaptor 1200 along a separate line connected through the DC electrical outlet 1250 to subsequent DC electrical appliances 700 in a chain configuration.

The AC conductor 1230 of the AC electrical appliance comprising an AC/DC power adaptor 1200 comprises an AC current-limiting device 1240. The AC current-limiting device 1240 has an AC current limit common to the plurality of AC electrical appliances 100. The AC current-limiting device 1240 limits a flow of current in the AC conductor 1230 when the flow of current within the conductor 1230 approaches the AC current limit. The AC current-limiting device in each AC electrical appliance 100 in the chain configuration, including the AC current-limiting device 1240 in the AC electrical appliance comprising an AC/DC power adaptor 1200, designates the AC current limit. In one embodiment, the AC current limit is 10 amps. In one embodiment, the AC current limit is 15-20 amps, the limit of a standard wall outlet. In one embodiment, the AC current-limiting device 1240 of the AC electrical appliance comprising an AC/DC power adaptor 1200 is a breaker. In one embodiment, the AC current-limiting device 1240 is a 10-amp breaker. In another embodiment, the AC current-limiting device 1240 is a digital current limiter, which may comprise a transistor, a microcontroller, and one or more sensors that monitor voltage and current. In other embodiments, the AC current-limiting device 1240 may be another type of circuit protection device. In one embodiment, the AC current-limiting device 1240 is located on a printed circuit board 1270. In one embodiment, the AC current-limiting device 1240 is located along the main circuit—the live wire—that connects the AC electrical appliance comprising an AC/DC power adaptor 1200 to each AC electrical appliance 100 in the chain configuration. In another embodiment, the AC current-limiting device 1240 comprises a current monitor, and the monitor is connected to a breaker located on a circuit that powers components of the AC electrical appliance comprising an AC/DC power adaptor 1200. The current monitor is on the main circuit, such that if the flow of current within the conductor 1230 on the main circuit approaches the AC current limit, the monitor sends a signal to the breaker located on a circuit further inside the AC electrical appliance comprising an AC/DC power adaptor 1200, a circuit that powers components of the AC electrical appliance comprising an AC/DC power adaptor 1200. The breaker trips, causing the AC electrical appliance comprising an AC/DC power adaptor 1200 to lose power and function, by limiting the flow of current in the conductor 1230. However, power is still passed through the AC electrical appliance comprising an AC/DC power adaptor 1200 to subsequent AC electrical appliances 100 in the chain configuration.

The AC conductor 1230 connects the AC electrical input 1210 and the AC electrical output 1220. Each AC conductor 1230 has a current-carrying capacity greater than the AC current limit common to the plurality of AC electrical appliances 100, designated by the AC current-limiting devices 130 and 1240. In one embodiment, the AC current limit is 10 amps. In one embodiment, the AC conductor 1230 is a wire. In one embodiment, the current-carrying capacity of the conductor 1230 equals a current-carrying capacity of a 16-gauge wire. This embodiment is especially suited for an AC current limit of 10 amps. In another embodiment, the AC current-carrying capacity of the conductor 1230 equals a current-carrying capacity of a 14-gauge wire. In other embodiments, the AC current-carrying capacity of the AC conductor 1230 is equal to the current-carrying capacity of wires with higher or lower gauges, but the AC conductor 1230 must be capable of carrying the full current load up to a point greater than the AC current limit. In one embodiment, the AC conductor 1230 is integrated into a printed circuit board (PCB) 1270.

In one embodiment, the AC electrical appliance comprising an AC/DC power adaptor 1200 passes AC power on to subsequent AC electrical appliances 100 in a chain configuration along one circuit, but on another circuit, the AC electrical appliance comprising an AC/DC power adaptor 1200 converts AC power supplied by the local source of electrical power 300 or previous AC electrical appliances 100 in the chain to DC power, passing DC power along to subsequent DC electrical appliances 700. Therefore, the AC electrical appliance comprising an AC/DC power adaptor 1200 has an AC electrical output 1220 and a DC electrical outlet 1250. Because the AC electrical appliance comprising an AC/DC power adaptor 1200 has an AC electrical output 1220, as well as a DC electrical outlet 1250, AC power can be passed through the AC electrical appliance comprising an AC/DC power adaptor 1200 to subsequent AC electrical appliances 100 connected in a chain configuration to the AC electrical output 1220, and DC power can also be passed out the AC electrical appliance comprising an AC/DC power adaptor 1200 along a separate line connected through the DC electrical outlet 1250 at the same time. In one embodiment, the AC electrical appliance comprising an AC/DC power adaptor 1200 supplies direct current (DC) power at 14 volts from the DC electrical outlet 1250. In one embodiment, the DC electrical outlet 1250 is a barrel connector. In this embodiment, a barrel extension cord can be plugged into the DC electrical outlet 1250, and into a subsequent DC electrical appliance 700, in order to connect the DC electrical appliance 700 to the AC electrical appliance comprising an AC/DC power adaptor 1200 in a chain configuration. In other embodiments, the DC electrical outlet 1250 is another one of many types of electrical connectors commonly known in the art.

In one embodiment, the DC current-limiting device 1260 of the AC electrical appliance comprising an AC/DC power adaptor 1200 is a breaker. In another embodiment, the current-limiting device 1260 is a digital current limiter, which may comprise a transistor, a microcontroller, and one or more sensors that monitor voltage and current. When the current-limiting device 1260 is a digital current limiter, the AC electrical appliance comprising an AC/DC power adaptor 1200 is also equipped with a fuse 1280 to protect against the eventuality that the digital current limiter might fail. The DC current-limiting device 1260 has a DC current limit. In one embodiment, the DC current limit is approximately 5 amps, which is equivalent to 70 watts of power at 14 volts. In other embodiments, the DC current-limiting device 1260 has a higher or lower current limit. In one embodiment, the DC current-limiting device 1260 limits a flow of current to the plurality of DC electronic appliances 700 that may be connected to the AC electrical appliance comprising an AC/DC power adaptor 1200 in a chain configuration if the DC current limit is approached.

Figure 13:
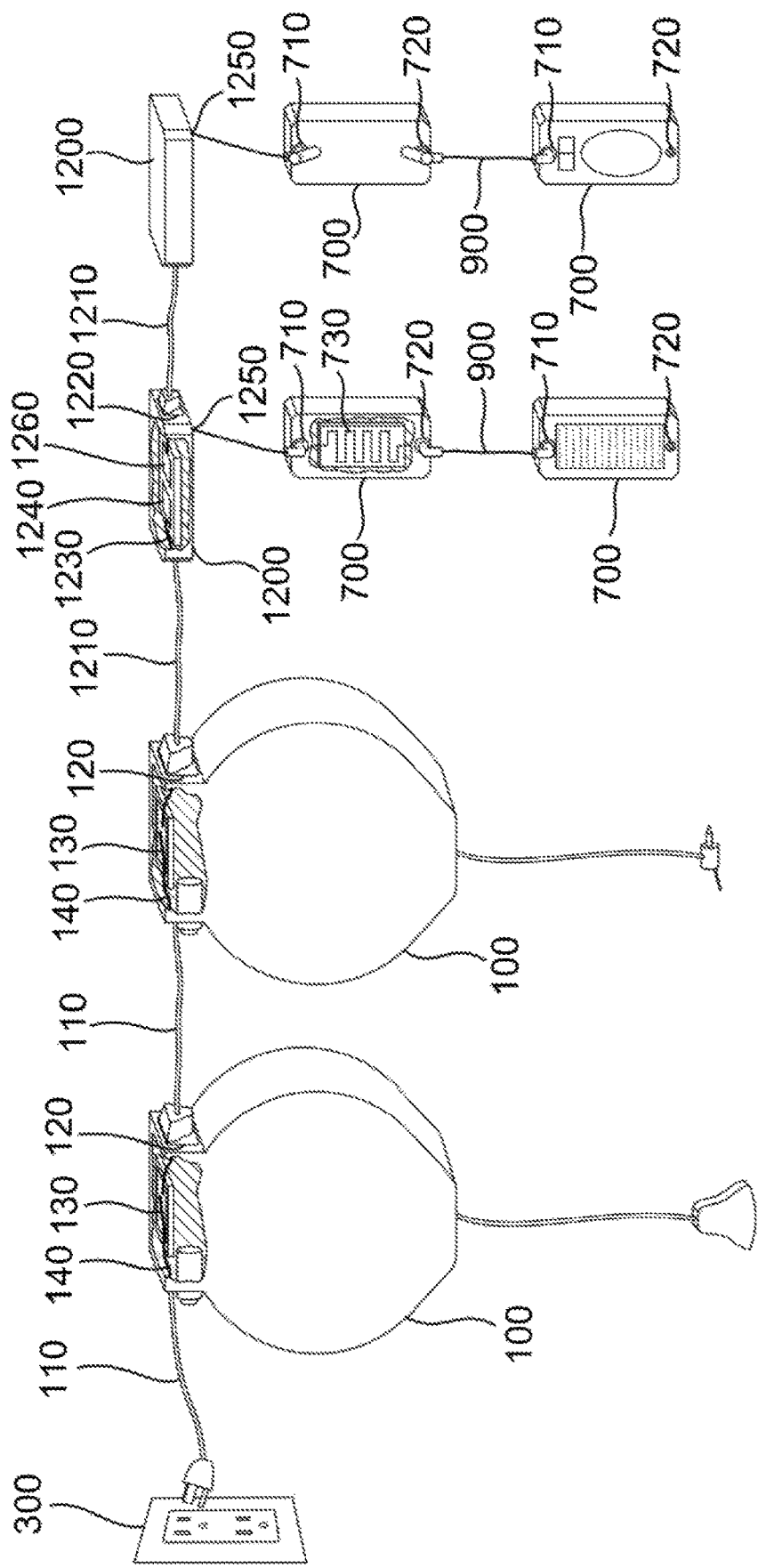
FIG. 13 depicts one embodiment of a plurality of AC electrical appliances connected in a chain configuration to each other and to a local source of electrical power, wherein the plurality of AC electrical appliances comprises one or more AC/DC power adaptors, and wherein one or more DC electrical appliances are connected to the AC/DC power adaptors and to each other in one or more chain configurations.

FIG. 13 depicts one embodiment of a plurality of AC electrical appliances 100 connected in a chain configuration to each other and to a local source of electrical power 300, wherein the plurality of AC electrical appliances 100 comprises one or more AC/DC power adaptors 1200, and one or more DC electrical appliances 700 connected to the one or more AC electrical appliances that comprise AC/DC power adaptors 1200 and to each other in one or more chain configurations. The local source of electrical power 300 may be a standard wall outlet. Each AC electrical appliance 100 comprises an AC electrical input 110, an AC electrical output 120, and an AC conductor 140 comprising an AC current-limiting device 130 with an AC current limit common to the plurality of AC electrical appliances 100. Each AC conductor 140 connects the AC electrical input 110 and the AC electrical output 120. Each AC conductor 140 has a current-carrying capacity greater than the AC current limit. One or more of the plurality of AC electrical appliances 100 comprise AC/DC power adaptors 1200. The AC/DC power adaptors 1200 comprise an AC electrical input 1210, an AC electrical output 1220, an AC conductor 1230 comprising an AC current-limiting device 1240 with a current limit common to the plurality of AC electrical appliances 100, a DC electrical outlet 1250, and a DC current-limiting device 1260, which has a DC current limit. Each DC electrical appliance 700 comprises a DC electrical input 710, a DC electrical output 720, and a DC conductor 730. Each DC conductor 730 connects the DC electrical input 710 and the DC electrical output 720. Each DC conductor 730 has a current-carrying capacity greater than the DC current limit of the DC current-limiting device 1260. The one or more DC electrical appliances 700 are connected to the one or more AC electrical appliances comprising AC/DC power adaptors 1200 and to each other in one or more chain configurations. In one embodiment, the plurality of AC electrical appliances 100, including the AC/DC power adaptors 1200, and the one or more DC electrical appliances 700 are connected to each other and to the local source of electrical power 300 in a parallel circuit.

In one embodiment, the plurality of AC electrical appliances 100 are connected in a chain configuration to each other and to a local source of electrical power 300, which, in one embodiment, is a standard 110- or 120-volt wall outlet in a home or another building, by means of the AC electrical input 110 and the AC electrical output 120 of each AC electrical appliance 100. In this embodiment, the AC electrical input 110 of one AC electrical appliance 100 is connected to the local source of electrical power 300. The AC electrical input 110 of a second AC electrical appliance 100 is connected to the AC electrical output 120 of the first AC electrical appliance 100. The AC electrical input 110 of a third AC electrical appliance 100 is connected to the AC electrical output 120 of the second AC electrical appliance 100, and so on, until a chain configuration of the plurality of AC electrical appliances 100 is formed. In one embodiment, the AC electrical input 110 of each AC electrical appliance 100 is a power cord, and the AC electrical output 120 of each AC electrical appliance 100 is an electrical outlet on the AC electrical appliance 100 into which a power cord can be plugged. The number of AC electrical appliances 100 in the chain depends upon the AC current limit common to the plurality of AC electrical appliances 100, which is designated by the AC current-limiting devices 130 in each of the AC electrical appliances 100. When the AC current limit is approached, at least one of the AC current-limiting devices 130 of the AC electrical appliances 100 will limit a flow of current in the AC conductor 140 in the AC electrical appliance 100, cutting power to at least one of the plurality of AC electrical appliances 100. A user will then know that the chain of AC electrical appliances 100 is drawing too much power and at least one of the AC electrical appliances 100 should be removed from the chain. In one embodiment, one or more of the plurality of AC electrical appliances 100 comprise AC/DC power adaptors 1200. One or more DC electrical appliances 700 are connected to the one or more AC/DC power adaptors 1200 and to each other in one or more chain configurations. In one embodiment, one chain of DC electrical appliances 700 extends from each AC/DC power adaptor 1200. Each AC/DC power adaptor 1200 converts AC power from the local source of electrical power 300 and the AC electrical appliance 100 chain to DC power. In one embodiment, each AC/DC power adaptor 1200 supplies direct current (DC) power at 14 volts.

In one embodiment, the one or more DC electrical appliances 700 are connected in a chain configuration to each AC/DC power adaptor 1200 and to each other by means of the DC electrical input 710 and the DC electrical output 720 of each DC electrical appliance 700. In this embodiment, the AC electrical input 1210 of each AC/DC power adaptor 1200 is connected to the chain of AC electrical appliances 100, which is connected to the local source of electrical power 300, which may be a standard wall outlet. The DC electrical input 710 of one DC electrical appliance 700 is connected to the DC electrical outlet 1250 of one AC/DC power adaptor 1200. The DC electrical input 710 of a second DC electrical appliance 700 is connected to the DC electrical output 720 of the first DC electrical appliance 700. The DC electrical input 710 of a third DC electrical appliance 700 is connected to the DC electrical output 720 of the second DC electrical appliance 700, and so on, until a chain configuration of the one or more DC electrical appliances 700 is formed. This can be repeated with another one or more AC/DC power adaptors 1200 in the AC chain, creating one or more additional DC chain configurations. In one embodiment, the DC electrical input 710 of each DC electrical appliance 700 is a barrel connector, and the DC electrical output 720 of each DC electrical appliance 700 is also a barrel connector. In one embodiment, the DC electrical input 710 and the DC electrical output 720 are interchangeable. In one embodiment, the DC electrical outlet 1250 of each AC/DC power adaptor 1200 is also a barrel connector. In one embodiment, the one or more DC electrical appliances 700 are connected to each AC/DC power adaptor 1200 and to each other by means of one or more extension cords 900. In one embodiment, the one or more extension cords 900 are barrel extension cords. In this embodiment, the barrel connectors connect with the barrel extension cords to link the one or more DC electrical appliances 700 to each other and to each AC/DC power adaptor 1200 in a chain configuration. In one embodiment, the one or more extension cords 900 are approximately 25 feet long. The length of the one or more extension cords 900 is significant in accounting for voltage drop. A 25-foot extension cord is a safe length that accounts for and minimizes voltage drop when chaining together several DC electrical appliances 700 from an AC/DC power adaptor 1200 supplying 14 volts of power. The number of DC electrical appliances 700 in the chain depends upon the DC current limit of the DC current-limiting device 1260 of each AC/DC power adaptor 1200. When the DC current limit is approached, the DC current-limiting device 1260 will limit a flow of current to the chain of DC electrical appliances 700, cutting power to each of the DC electrical appliances 700 in the chain. A user will then know that the chain of DC electrical appliances 700 is drawing too much power and at least one of the DC electrical appliances 700 should be removed from the chain. If the chain of DC electrical appliances 700 draws so much power that the AC current limit is also approached, the AC current-limiting device 1240 in the AC/DC power adaptor 1200 might also limit a flow of current through the AC/DC power adaptor 1200, causing the AC/DC power adaptor 1200 to lose power, and in one embodiment, along with any AC electrical appliances downstream from the AC/DC power adaptor 1200. In one embodiment, each AC electrical appliance 100 comprises a sensor 190 in communication with the conductor 140 of the AC electrical appliance 100 that indicates the flow of current within the AC conductor 140. In one embodiment, when the flow of current approaches the AC current limit, the sensor 190 will indicate that the AC current limit is being approached by displaying a signal, such as turning on a red LED light.

Figure 14:
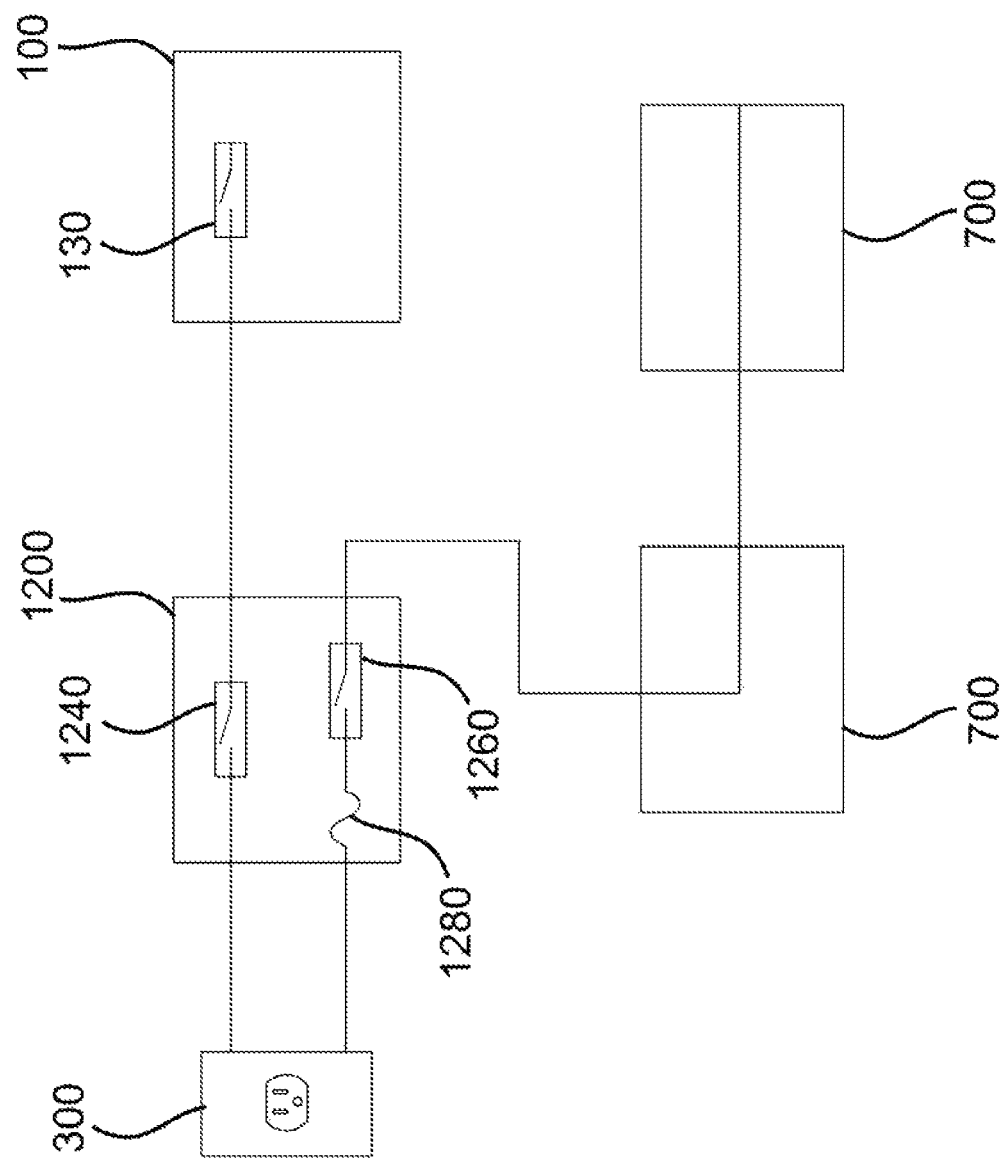
FIG. 14 depicts one embodiment of a circuit diagram of an AC current-limiting device inside each AC electrical appliance, including an AC current-limiting device inside one AC/DC power adaptor, and a DC current-limiting device also inside the AC/DC power adaptor.

FIG. 14 depicts one embodiment of a circuit diagram of an AC current-limiting device 130 inside each AC electrical appliance, including an AC current-limiting device 1240 inside one AC/DC power adaptor 1200, and a DC current-limiting device 1260 also inside the AC/DC power adaptor 1200. In one embodiment, the plurality of AC electrical appliances 100, including one or more AC/DC power adaptors 1200, and the one or more DC electrical appliances 700 are all connected in one or more chain configurations to each other and to a local source of electrical power 300 in a parallel circuit. Therefore, the total current through the appliances in the chain is the sum of the currents through each electrical appliance. In this embodiment, if an electrical appliance is added to the chain that causes the sum of the currents through each electrical appliance to approach the AC current limit, the AC current-limiting device 130 in at least one of the plurality of AC electrical appliances 100, which may include the current-limiting device 1240 in the AC electrical appliances comprising AC/DC power adaptors 1200, limits a flow of current in the AC conductor 140 of the at least one of the plurality of AC electrical appliances 100. In one embodiment, the AC current-limiting device 130 in each AC electrical appliance 100 is located along the main circuit—the live wire—that connects each AC electrical appliance 100 in the chain configuration. In this embodiment, the AC current-limiting device 130 in only one of the plurality of AC electrical appliances 100 is tripped, and the one that trips is the AC current-limiting device 130 that most quickly senses that the AC current limit has been exceeded. Any of the plurality of AC electrical appliances, including the AC electrical appliances comprising AC/DC power adaptors 1200, downstream from the one of the plurality of AC electrical appliances whose AC current-limiting device is tripped will lose power. A user will then know that the electrical appliances are drawing too much power and at least one of the electrical appliances should be removed from the chain or turned off. In another embodiment, the AC current-limiting device 130 comprises a current monitor, and the monitor is connected to a breaker located on a circuit that powers components of the AC electrical appliance 100. The current monitor is on the main circuit, such that if the flow of current within the AC conductor 140 on the main circuit approaches the AC current limit, the monitor sends a signal to a breaker located on a circuit further inside the AC electrical appliance 100 that powers components of the AC electrical appliance 100, which trips, causing the AC electrical appliance 100 to lose power and function, limiting the flow of current in the AC conductor 140. However, power is still passed through the AC electrical appliance 100 to a subsequent AC electrical appliance 100 in the chain configuration. Each AC electrical appliance comprising an AC/DC power adaptor 1200 also has a DC current-limiting device 1260 with a DC current limit. The AC electrical appliance comprising an AC/DC power adaptor 1200 regulates the current of any DC electrical appliances 700 attached to it in a chain configuration. When the DC current limit is exceeded, the DC current-limiting device 1260 will trip, cutting power to each of the DC electrical appliances 700 in the chain. A user will then know that the chain of DC electrical appliances 700 is drawing too much power and at least one of the DC electrical appliances 700 should be removed from the chain. If the chain of DC electrical appliances 700 draws so much power that the AC current limit is also approached, the AC current-limiting device 1240 in the AC/DC power adaptor 1200 might also trip on its AC circuit, causing the AC/DC power adaptor 1200 to lose power, along with any AC electrical appliances 100 downstream from the AC/DC power adaptor 1200.

In one embodiment, each AC current-limiting device 130 is a breaker. In one embodiment, the AC current limit is 10 amps. In another embodiment, the AC current limit is 15-20 amps, which is the same as the current limit of a standard wall outlet. In one embodiment, each AC current-limiting device 130 may limit current to only 10 amps. In one embodiment, each DC current-limiting device 1260 is a digital current limiter, which may comprise a transistor, a microcontroller, and one or more sensors that monitor voltage and current. Each DC current-limiting device 1260 has a DC current limit. In one embodiment, the DC current limit is approximately 5 amps, which is equivalent to 70 watts of power at 14 volts. In other embodiments, the DC current-limiting device 1260 has a higher or lower current limit. When the DC current-limiting device 1260 is a digital current limiter, the AC/DC power adaptor 1200 is also equipped with a fuse 1280 to protect against the eventuality that the digital current limiter might fail.

Figure 15:
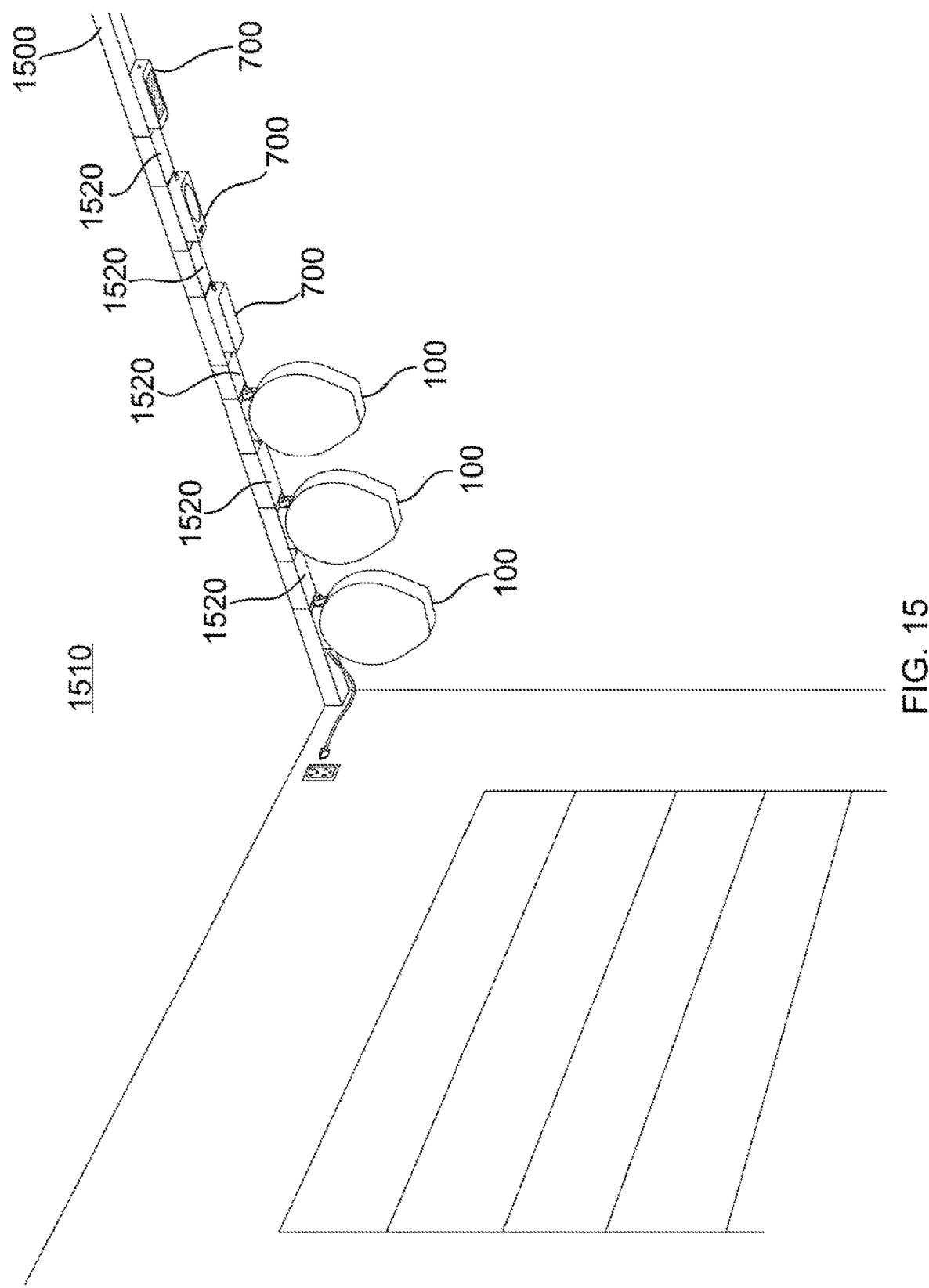
FIG. 15 depicts one embodiment of the plurality of AC electrical appliances, including one or more AC/DC power adaptors, and one or more DC appliances connected in a chain configuration mounted on a metal track on a garage ceiling.

FIG. 15 depicts one embodiment of the plurality of AC electrical appliances 100, including one or more AC/DC power adaptors 1200, and one or more DC appliances 700 connected in a chain configuration mounted on a metal track 1500 on a garage ceiling 1510. In one embodiment, the plurality of AC electrical appliances 100 are selected from a group of garage appliances. That group may consist of extension cords, vacuums, air pumps, power adaptors, and combinations thereof. In one embodiment, the plurality of DC electrical appliances 700 are selected from a group of garage appliances. That group may consist of lights, speakers, parking assistants, power winches, and combinations thereof. Garages tend to have a scarcity of electrical outlets. For this reason, intelligent current limiting that enables chaining of the plurality of AC electrical appliances 100 and the one or more DC electrical appliances 700 is particularly useful in a garage setting. In one embodiment, the metal track 1500 allows each appliance to be conveniently mounted to the ceiling in a chain configuration. In one embodiment, track covers 1520 shield extension or power cords that may connect the AC electrical appliances 100 and the DC electrical appliances 700 in chain configurations from view.

The invention claimed is:

1. A system of chained AC and DC electrical appliances and at least one AC/DC power adapter comprising:
    a plurality of AC electrical appliances connected in a chain configuration each AC electrical appliance comprising:
        an AC electrical input;
        an AC electrical output;
        a main circuit between the AC electrical input and the AC electrical output;
        a second circuit powering the components of the AC electrical appliance;
        a conductor connecting the AC electrical input, the AC electrical output, and the second circuit powering the components of the AC electrical appliance, the conductor comprising;
            an AC current limiting device with an AC current limit common to the plurality of AC electrical appliances;
            the conductor having a current-carrying capacity greater than the AC current limit;
    at least one AC/DC power adapter connected in the chain configuration, the AC/DC power adapter comprising:
        an AC electrical inlet;
        an AC electrical outlet;
        a DC electrical outlet;

a second main circuit between the AC electrical inlet and the AC electrical outlet;
a separate circuit connected to the DC electrical outlet;
a DC current limiting device on the separate circuit connected to the DC electrical outlet having a DC current limit;
the separate circuit connected to the DC electrical outlet having a current-carrying capacity greater than the DC current limit;
a plurality of DC electrical appliances, connected to the AC/DC power adapter and to each other in the chain configuration each DC electrical appliance comprising:
a DC electrical input;
a DC electrical output; and
a third main circuit between the DC electrical input and the DC electrical output;
a divergent circuit connected to the DC electrical outlet;
wherein, the AC current limiting device in the conductor of at least one of the AC electrical appliances limits a flow of current to the second circuit powering the components of the at least one AC electrical appliance when the flow of current within the conductor of the AC electrical appliance approaches the AC current limit;
wherein when the AC current limiting device limits the flow of current to the second circuit powering the components of the AC electrical appliance the flow of current is still passed through the AC electrical appliance along the main circuit to subsequent AC electrical appliances and the at least one AC/DC power adapter in the chain configuration;
wherein, the DC current limiting device in the AC/DC power adapter limits a flow of current to the separate circuit connected to the DC electrical outlet when the flow of current within the separate circuit connected to the DC electrical outlet of the AC/DC power adapter approaches the DC current limit; and
wherein when the DC current limiting device limits the flow of current to the separate circuit connected to the DC electrical outlet the flow of current is still passed through the AC/DC power adapter along the second main circuit to subsequent AC electrical appliances in the chain configuration.

2. The invention of claim 1, further comprising an AC current monitor to sense the flow of current and send a signal to the AC current limiting device.

3. The invention of claim 2, wherein the AC current monitor is located on the main circuit.

4. The invention of claim 1, further comprising a breaker located on the separate circuit connected to the DC electrical outlet.

5. The invention of claim 3, further comprising a breaker located on the second circuit powering the components of the AC electrical appliance.

6. The invention of claim 1, wherein each of the AC and DC current limiting devices is a digital current limiter comprising a transistor, a microcontroller, and at least one sensor to monitor current.

7. The invention of claim 6 wherein, the AC and DC current limiting devices are adapted to communicate with a mobile electronic device.

8. The invention of claim 7 wherein, the mobile electronic device includes a user interface for controlling the flow of current to each chained AC electrical appliance and the at least one AC/DC power adapter.

9. The invention of claim 8 wherein, each of the plurality of AC electrical appliances and the at least one AC/DC power adapter are removably attached to a track mounted on a garage ceiling.

10. The invention of claim 8 wherein, at least one of; the plurality of AC electrical appliances and the at least one AC/DC power adapter, is removably attached to a track mounted on a garage ceiling and at least one of the plurality of electrical appliances or the at least one AC/DC power adapter is not attached to a track mounted on a garage ceiling.

11. A method of chaining AC and DC electrical appliances and at least one AC/DC power adapter comprising:
providing a plurality of AC electrical appliances connected to a local source of power in a chain configuration;
each AC electrical appliance comprising;
an AC electrical input;
an AC electrical output;
a main circuit between the AC electrical input and the AC electrical output;
a second circuit powering the components of the AC electrical appliance;
a conductor connecting the AC electrical input, the AC electrical output, and the second circuit powering the AC electrical appliance, the conductor comprising;
an AC current limiting device with an AC current limit common to the plurality of AC electrical appliances;
the conductor having a current-carrying capacity greater than the AC current limit;
providing in the chain configuration, at least one AC/DC power adapter, the AC/DC power adapter comprising:
an AC electrical inlet;
an AC electrical outlet;
a DC electrical outlet;
a main circuit between the AC electrical inlet and the AC electrical outlet;
a separate circuit connected to the DC electrical outlet;
a DC current limiting device on the separate circuit connected to the DC electrical outlet having a DC current limit;
the separate circuit, connected to the DC electrical outlet, having a current-carrying capacity greater than the DC current limit;
providing a plurality of DC electrical appliances, connected to the AC/DC power adapter and to each other in the chain configuration each DC electrical appliance comprising:
a DC electrical input;
a DC electrical output; and
a third main circuit between the DC electrical input and the DC electrical output;
a divergent circuit connected to the DC electrical outlet;
wherein, the AC current limiting device in the conductor of at least one of the AC electrical appliances limits a flow of current to the second circuit powering the components of the at least one AC electrical appliance when the flow of current within the conductor of the AC electrical appliance approaches the AC current limit;
wherein when the AC current limiting device limits the flow of current to the second circuit powering the components of the AC electrical appliance the flow of current is still passed through the AC electrical appliance along the main circuit to subsequent AC electrical appliances and the at least one AC/DC power adapter in the chain configuration;

wherein, the DC current limiting device in the AC/DC power adapter limits a flow of current to the separate circuit connected to the DC electrical outlet when the flow of current within the separate circuit connected to the DC electrical outlet of the AC/DC power adapter approaches the DC current limit; and wherein when the DC current limiting device limits the flow of current to the separate circuit connected to the DC electrical outlet the flow of current is still passed through the AC/DC power adapter along the second main circuit to subsequent AC electrical appliances in the chain configuration.

12. The invention of claim 11, further comprising an AC current monitor to sense the flow of current and send a signal to the AC current limiting device.

13. The invention of claim 12, wherein the AC current monitor is located on the main circuit.

14. The invention of claim 11, further comprising a breaker located on the separate circuit connected to the DC electrical outlet.

15. The invention of claim 11, further comprising a breaker located on the second circuit powering the components of the AC electrical appliance.

16. The invention of claim 11, wherein the AC and DC current-limiting devices are digital current limiters, each limiter comprising a transistor, a microcontroller, and at least one sensor to monitor current.

17. The invention of claim 16, wherein, the AC and DC current limiting devices are is adapted to communicate with a mobile electronic device.

18. The invention of claim 17, wherein, the mobile electronic device includes a user interface for controlling the flow of current to each chained AC electrical appliance and the at least one AC/DC power adapter.

19. The invention of claim 18 wherein, each of the plurality of AC electrical appliances and the at least one AC/DC power adapter are removably attached to a track mounted on a garage ceiling.

20. The invention of claim 18 wherein, at least one of the plurality of AC electrical appliances or the at least one AC/DC power adapter is removably attached to a track mounted on a garage ceiling and at least one of the plurality of AC electrical appliances or the at least one AC/DC power adapter is not attached to a track mounted on a garage ceiling.

* * * * *